(12) United States Patent
Inoue et al.

(10) Patent No.: US 8,793,052 B2
(45) Date of Patent: Jul. 29, 2014

(54) ELECTROMAGNETIC SUSPENSION SYSTEM

(75) Inventors: Hirofumi Inoue, Toyota (JP); Masanori Horie, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 571 days.

(21) Appl. No.: 12/678,945

(22) PCT Filed: Dec. 1, 2008

(86) PCT No.: PCT/JP2008/071804
§ 371 (c)(1),
(2), (4) Date: Mar. 18, 2010

(87) PCT Pub. No.: WO2010/064291
PCT Pub. Date: Jun. 10, 2010

(65) Prior Publication Data
US 2011/0218707 A1    Sep. 8, 2011

(51) Int. Cl.
*B60G 17/015* (2006.01)
*B60G 17/016* (2006.01)
*F16F 9/00* (2006.01)

(52) U.S. Cl.
CPC ............ *B60G 17/015* (2013.01); *B60G 17/016* (2013.01); *F16F 9/00* (2013.01)
USPC ............. 701/37; 701/113; 701/114; 701/115; 188/297

(58) Field of Classification Search
CPC .... B60G 17/00; B60G 17/015; B60G 17/016; F16F 9/00
See application file for complete search history.

(56) References Cited

U.S. PATENT DOCUMENTS

| 6,019,495 A * | 2/2000 | Yamada et al. | 701/37 |
| 2008/0164111 A1* | 7/2008 | Inoue et al. | 188/297 |

FOREIGN PATENT DOCUMENTS

| JP | 60 79030 | 6/1985 |
| JP | 6 344745 | 12/1994 |
| JP | 7 444 | 1/1995 |
| JP | 3046040 | 5/2000 |
| JP | 2005 35486 | 2/2005 |
| JP | 3629137 | 3/2005 |
| JP | 2005 162021 | 6/2005 |

(Continued)

OTHER PUBLICATIONS

English translation of the International Preliminary Report on Patentability and Written Opinion of the International Searching Authority issued Jun. 16, 2011, in PCT/JP2008/071804.

*Primary Examiner* — John Q Nguyen
*Assistant Examiner* — Edward Torchinsky
(74) *Attorney, Agent, or Firm* — Oblon, Spivak, McClelland, Maier & Neustadt, L.L.P.

(57) ABSTRACT

A change of performance of an electromagnetic suspension unit is detected. When an integral $\Sigma|Vs'-Vs^*|$ of an absolute value of a difference between an actual value $Vs^*$ and an estimated value $Vs'$ of an expansion/contraction velocity of a shock absorber is larger than a performance change threshold value Sth, it is detected that the performance of the electromagnetic suspension unit is changed. Further, when an integral $\Sigma|Vs^*|$ of an absolute value of the actual value $Vs^*$ is larger than an integral $\Sigma|Vs'|$ of an absolute value of the estimated value $Vs'$ by a predetermined value, performance of the shock absorber is changed such that a damping force of the shock absorber is reduced. Thus, the performance change of the electromagnetic suspension unit is detected based on the expansion/contraction velocity of the shock absorber.

14 Claims, 15 Drawing Sheets

(56) References Cited

FOREIGN PATENT DOCUMENTS

| | | |
|---|---|---|
| JP | 2005 254940 | 9/2005 |
| JP | 2006 143146 | 6/2006 |
| JP | 2006 168400 | 6/2006 |
| JP | 2008 296802 | 12/2008 |
| JP | 2009 23624 | 2/2009 |

* cited by examiner (a) ESTIMATION MODEL 210

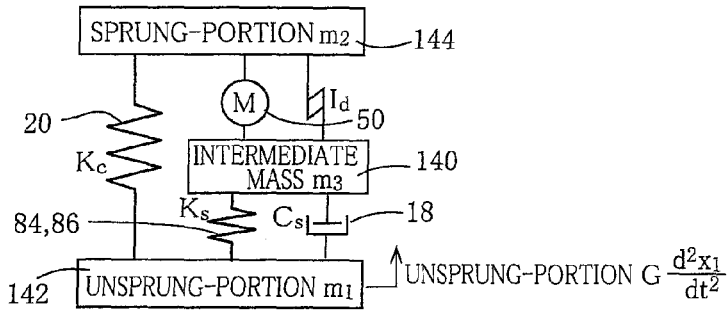

(b)
$$m_2 * \frac{d^2x_2}{dt^2} = -K_c(x_2-x_1) - I_d\left(\frac{d^2x_2}{dt^2} - \frac{d^2x_3}{dt^2}\right) - F_m \quad \cdots (4b1)$$

$$m_3 * \frac{d^2x_3}{dt^2} = -K_s(x_3-x_1) - C_s\left(\frac{dx_3}{dt} - \frac{dx_1}{dt}\right) - I_d\left(\frac{d^2x_3}{dt^2} - \frac{d^2x_2}{dt^2}\right) + F_m \quad \cdots (4b2)$$

(c)
$$\dot{X}(t) = AX(t) + BU(t) + L\{y(t) - CX(t)\} \quad \cdots (4c1)$$

$$U = \begin{bmatrix} x_1 \\ \frac{dx_1}{dt} \\ F_m \end{bmatrix} \quad X = \begin{bmatrix} x_2 \\ \frac{dx_2}{dt} \\ x_3 \\ \frac{dx_3}{dt} \end{bmatrix} \quad \cdots (4c2)$$

$$A = \begin{bmatrix} 0 & 1 & 0 & 0 \\ \frac{-m_3K_c - K_cI_d}{\alpha} & 0 & \frac{-K_sI_d}{\alpha} & \frac{-C_sI_d}{\alpha} \\ 0 & 0 & 0 & 0 \\ \frac{-K_cI_d}{\alpha} & 0 & \frac{-m_2K_s - K_sI_d}{\alpha} & \frac{-m_2C_s - C_sI_d}{\alpha} \end{bmatrix} \quad \cdots (4c3)$$

$$B = \begin{bmatrix} 0 & 0 & 0 \\ \frac{m_3K_c + K_cI_d + K_sI_d}{\alpha} & \frac{C_sI_d}{\alpha} & \frac{-m_3}{\alpha} \\ 0 & 0 & 0 \\ \frac{m_2K_s + K_sI_d + K_cI_d}{\alpha} & \frac{m_2C_s + C_sI_d}{\alpha} & \frac{m_2}{\alpha} \end{bmatrix} \quad \cdots (4c4)$$

$$\alpha = m_2m_3 + I_d(m_2 + m_3)$$

FIG.4

$$m_3 * \frac{d^2x_3}{dt^2} = -K_s(x_3-x_1) - C_s(\frac{dx_3}{dt} - \frac{dx_1}{dt}) - I_d(\frac{d^2x_3}{dt^2} - \frac{d^2x_2}{dt^2}) + F_m$$

ELECTROMAGNETIC SUSPENSION SYSTEM

TECHNICAL FIELD

The present invention relates to detection of change of performance of an electromagnetic suspension unit that is included in a suspension system of a vehicle.

BACKGROUND ART

JP2006-168400A (Patent Document 1) discloses (a) detecting presence of abnormality in an electromagnetic suspension unit that is equipped with an electric motor, by comparing an estimated value of a sprung-portion acceleration and an actually detected value of the sprung-portion acceleration, and also (b) detecting presence of abnormality in the electromagnetic suspension unit, by comparing an estimated value of a rotational angle of the electric motor and an actual value of the rotational angle of the electric motor. The estimated value of the sprung-portion acceleration is a value that is estimated based on an actual value of an acceleration of a wheel-side portion in a vertical direction by utilizing an observer.

JP2005-254940A (Patent Document 2) discloses detecting presence of abnormality in an electromagnetic suspension unit that is equipped with an electric motor, based on whether an actually operating amount of the electric motor (rotational angle of the motor or amount of change of stroke of the motor) is within a range that is dependent on a control value based on which the electric motor is controlled.
[Patent Document 1] JP2006-168400A
[Patent Document 2] JP2005-254940A

DISCLOSURE OF THE INVENTION

Object to be Solved by the Invention

An object of the present invention is to make it possible to correctly detect change of performance of an electromagnetic suspension unit.

Measures for Solving the Object and Effects Provided by the Measures

An electromagnetic suspension system recited in claim 1 includes: (i) an electromagnetic suspension unit which is provided for a wheel of a vehicle and which is disposed between a body-side portion and a wheel-side portion of the vehicle, the electromagnetic suspension unit including (a) a hydraulic shock absorber and (b) an electric actuator that is configured to apply a vertical force between the body-side portion and the wheel-side portion; and (ii) a performance-change detecting device including an actual absorber-expansion/contraction-related amount obtaining portion configured to obtain an actual value of an absorber-expansion/contraction-related amount upon application of vibration to the electromagnetic suspension unit in a vertical direction, the absorber-expansion/contraction-related amount including at least one of amount and velocity of expansion/contraction of the shock absorber in the vertical direction, wherein the performance-change detecting device is configured to detect change of performance of the electromagnetic suspension unit, based on the actual value of the absorber-expansion/contraction-related amount obtained by the actual absorber-expansion/contraction-related amount obtaining portion.

In the electromagnetic suspension system recited in claim 1 of the present application, the actual value of the amount related to the expansion and contraction of the hydraulic shock absorber is obtained, and it is judged whether or not there is a change of the performance of the electromagnetic suspension unit, based on the actual value of the amount related to the expansion and contraction of the shock absorber. Since the performance change is detected based on the actual value of the amount related to the expansion and contraction of the shock absorber, a change of the performance of the shock absorber can be directly detected. Further, based on the actual value of the amount related to the expansion and contraction of the shock absorber, a change of the performance of the electric actuator also can be detected.

The judgment as to whether there is a change of the performance is made in the state in which the vibration is being applied to the electromagnetic suspension unit. For example, this state corresponds to a state in which the vehicle is running and also a state in which the vibration is being applied to the electromagnetic suspension unit while the vehicle is being stopped. While the vehicle is running, the vibration is applied to the electromagnetic suspension unit mainly from a road surface. While the vehicle is being stopped, the vibration is applied to the electromagnetic suspension unit from an external device (vibrating device) or from the electric actuator. In case of application of the vibration from the vibrating device, it is easy to apply the vibration of a predetermined frequency to the electromagnetic suspension unit.

CLAIMABLE INVENTION

There will be described, by ways of examples, various modes of the invention deemed to contain claimable features for which protection is sought. Hereinafter, the invention deemed to contain the claimable features will be referred to as "claimable invention" where appropriate. The claimable invention includes at least "the present invention" or "the invention of the present application" which is an invention described in claims, and could include also specific concept of the invention of the present application, generic concept of the invention of the present application and other concept of the invention of the present application. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes, preferred embodiments of the invention and prior art. In a limit in accordance with such an interpretation, a mode of the claimable invention can be constituted by not only each one of these modes but also either a mode provided by any one of these modes and additional components incorporated therein or a mode provided by any one of these modes without some of components recited therein.

Among the following modes, modes (1) through (3) correspond to claims 1 through 3, respectively; mode (6) corresponds to claim 4; mode (12) corresponds to claim 5; modes (17) through (19) correspond to claims 6 through 8, respectively; modes (20) and (21) correspond to claims 9 and 10, respectively; and modes (24), (25) and (27) correspond to claims 11, 12 and 13, respectively.

(1) An electromagnetic suspension system including:
an electromagnetic suspension unit which is provided for a wheel of a vehicle and which is disposed between a body-side portion and a wheel-side portion of the vehicle, the electromagnetic suspension unit including (a) a hydraulic shock absorber and (b) an electric actuator that is configured to apply a vertical force between the body-side portion and the wheel-side portion; and a performance-change detecting device including an actual absorber-expansion/contraction-related amount obtaining portion configured to obtain an actual value of an absorber-expansion/contraction-related amount upon application of vibration to the electromagnetic suspension unit in a vertical direction, the absorber-expansion/contraction-related amount including at least one of amount and velocity of expansion/contraction of the shock absorber in the vertical direction, wherein the performance-change detecting device is configured to detect change of performance of the electromagnetic suspension unit, based on the actual value of the absorber-expansion/contraction-related amount obtained by the actual absorber-expansion/contraction-related amount obtaining portion.

The performance change of the electromagnetic suspension unit means a change of the performance of the suspension unit from a predetermined standard performance. The standard performance may be interpreted to correspond to the performance of the suspension unit when the suspension unit is in a normal state, the performance of the suspension unit when the suspension unit is in a brand-new state, the performance of the suspension unit when the suspension unit is in a state requiring neither replacement nor repair, or the performance of the suspension unit when the suspension unit is in a usable state. That is, where the standard performance corresponds to the performance of the suspension unit when the suspension unit is in the normal state, the performance change means that the suspension unit is not in the normal state. Where the standard performance corresponds to the performance of the suspension unit when the suspension unit is in the brand-new state, the performance change means that the suspension unit is not in the brand-new state. Where the standard performance corresponds to the performance of the suspension unit when the suspension unit is in the state requiring neither replacement nor repair, the performance change means that the suspension unit is in a state requiring replacement or repair. Where the standard performance corresponds to the performance of the suspension unit when the suspension unit is in the usable state, the performance change means that the suspension unit is in state (abnormal state) which disables further continuation of use of the suspension unit.

The amount of the expansion/contraction of the shock absorber is an amount of vertical displacement of a piston and a cylinder body of the shock absorber relative to each other, from a standard relative position. The standard relative position may be, for example, a relative position of the piston and the cylinder body when each of the body-side portion and the wheel-side portion is in a stationary state (neutral state) with equilibrium between a standard spring force of a suspension spring and a vertical force which acts between the body-side portion and the wheel-side portion and which is dependent on a load acting on each of the body-side portion and the wheel-side portion. On the other hand, a length of the shock absorber is a distance between an end portion of the cylinder body and a predetermined portion (for example, an end portion) of a piston rod. Where the length of the shock absorber when the piston and the cylinder body of the shock absorber are positioned in a standard relative position, is regarded as a standard length of the shock absorber, the length of the shock absorber corresponds to a sum of the standard length and an amount of expansion of the shock absorber (wherein the sum is obtained by taking account of whether the amount of the expansion is a positive value or a negative value). Therefore, the length of the shock absorber and the expansion/contraction amount of the shock absorber have an one-to-one relationship, so that the length of the shock absorber is regarded a kind of the absorber-expansion/contraction-related amount. The velocity of expansion/contraction of the shock absorber is a derivative of the amount of expansion/contraction of the shock absorber, with respect to time. The expansion/contraction velocity can be obtained irrespective of the standard relative position.

(2) The electromagnetic suspension system according to mode (1), wherein the performance-change detecting device includes: (a) an absorber-expansion/contraction-related amount estimating portion that is configured to obtain an estimated value of the absorber-expansion/contraction-related amount; and (b) a comparison-based performance-change detecting portion that is configured to detect the change of the performance of the electromagnetic suspension unit, by comparing the estimated value of the absorber-expansion/contraction-related amount estimated by the absorber-expansion/contraction-related amount estimating portion and the actual value of the absorber-expansion/contraction-related amount obtained by the actual absorber-expansion/contraction-related amount obtaining portion.

By comparing the actual value and estimated value of the expansion/contraction-related amount of the shock absorber to each other, it is possible to judge whether the performance of the electromagnetic suspension unit is changed or not.

The comparison between the actual value and the estimated value may be made by either comparing directly the actual value as such and the estimated value as such or comparing a processed value obtained by processing the actual value and a processed value obtained by processing the estimated value.

Since the expansion/contraction amount and expansion/contraction velocity are changed depending on vibration applied to the electromagnetic suspension unit, the comparison between the actual value and estimated value may be made by comparing the actual and estimated values upon peak of the applied vibration. Further, where statistically processed values obtained by processing the actual and estimated values are used, an average displacement based on the actual value and an average displacement based on the estimated value can be compared to each other, or an average displacement velocity based on the actual value and an average displacement velocity based on the estimated value can be compared to each other.

For example, an integral of an absolute value of the actual value over a predetermined time period and an integral of an absolute value of the estimated value over the predetermined time period may be obtained, so that the integral of the absolute value of the actual value and the integral of the absolute value of the estimated value can be compared to each other. Thus, by comparing the integrals of the respective absolute values, it is possible to compare an average of the absolute value of the actual value and an average of the absolute value of the estimated value, to each other. Further, the comparison can be made not only by using the integrals of the respective absolute values but also by using the averages of the respective absolute values. Further, an integral or average of an absolute value of a peak value (amplitude) of the actual value over a predetermined time period and an integral or average of an absolute value of a peak value (amplitude) of the estimated value over the predetermined time period may be used.

Further, where the actual value or the like (including the actual value as such and the processed value obtained by processing the actual value) and the estimated value or the like (including the estimated value as such and the processed value obtained by processing the estimated value) are compared to each other, a difference or ratio therebetween can be obtained, and the judgment as to whether the performance is changed or not, can be correctly made based on at least one of the difference and ratio between the actual value or the like and the estimated value or the like.

Further, where the actual value of the amplitude and the estimated value of the amplitude are compared to each other, or where the actual value of the average of the displacement and the estimated value of the average of the displacement are compared to each other, there is a case in which it is preferable that such a comparison is made based on the amplitude or displacement average in its component of the vibration of a desired frequency range. To this end, for example, the component of the vibration of the desired frequency range may be extracted by subjecting the actual and estimated values to a filter processing or a Fourier transform so that the processed actual value or the like and the processed estimated value are compared to each other, or alternatively, vibration of the desired frequency range may be applied to the electromagnetic suspension unit so that the actual value or the like and the estimated value or the like upon application of such vibration to the electromagnetic suspension unit are compared to each other.

Further, frequency of the actual value and frequency of the estimate value may be compared to each other.

Further, where the actual value or the like and the estimated value or the like are compared to each other, although it is not impossible to compare the actual value or the like of the expansion/contraction amount and the estimated value or the like of the expansion/contraction velocity, to each other, it is preferable to compare the actual value or the like of the expansion/contraction amount and the estimated value or the like of the expansion/contraction amount, or compare the actual value or the like of the expansion/contraction velocity and the estimated value or the like of the expansion/contraction velocity.

(3) The electromagnetic suspension system according to mode (2), wherein the comparison-based performance-change detecting portion includes a performance-change-presence detecting portion that is configured, when a value related to an average of an absolute value of a difference between the estimated value and the actual value of the absorber-expansion/contraction-related amount over a predetermined time period is larger than a predetermined threshold value, to detect that the performance of the electromagnetic suspension unit is changed.

The value related to the average of the absolute value of the difference between the estimated and actual values over the predetermined time period includes an integral of the absolute value over the predetermined time period, an average of the absolute value over the predetermined time period and a statistically processed value obtained by statistically processing the integral or average of the absolute value.

When the value (hereinafter referred to as average expansion/contraction-related-amount difference value) related to the average of the absolute value of the difference over the predetermined time period is not larger than the predetermined threshold value, it is possible to consider that the performance is not changed. When the average expansion/contraction-related-amount difference value is larger than the predetermined threshold value, it is possible to judge that the performance is changed. The judgment as to whether the performance is changed or not, may be made when the same result is obtained consecutively a predetermined number of times or more, or may be made with provision of hysteresis.

Where the threshold value is set to 0 or is set to a value which is larger than 0 and which is not smaller than a first predetermined value (that is close to 0 and is larger than 0), it is judged that the performance is changed when a current state of the suspension unit is slightly deviated from a state assumed for obtaining the estimated value, namely, a state (such as the normal state and brand-new state) assumed for obtaining the standard performance. Since it is common that the estimated value is obtained based on an estimation model, the standard performance is dependent on the estimation model. For example, where the estimation model is conceptually constituted by the suspension unit that is in the brand-new state, it is judged that performance is changed when the current state is deviated from the brand-new state.

On the other hand, where the threshold value is set to a large positive value which is larger than a second predetermined value (that is larger than 0), it is judged that the performance is changed when a current state of the suspension unit is largely deviated from the state for assumed for obtaining the estimated value. For example, where the estimation model is conceptually constituted by the suspension unit that is in the brand-new state, it is judged that performance is changed when the current state corresponds to a state requiring replacement or repair or corresponds to an unusable state.

The estimation model and the threshold value are determined by taking account of the above-described circumstances.

Further, where a plurality of estimation models and a plurality of threshold values are provided, it is possible to detect a level (degree) of reduction of the performance, namely, detect which one of levels the performance is currently found in. For example, this arrangement makes it possible to inform a vehicle driver of a current level of performance reduction, so that the vehicle driver can obtain detailed information about the level of performance reduction. Further, in a process of designing the electromagnetic suspension unit, it is possible to assess a process of change of the performance.

Further, at least one of the plurality of estimation models and at least one of the plurality of threshold values may be selectable. In an arrangement in which the vehicle driver is informed of the performance change, it is possible to inform the vehicle drive of the performance change when a current level of the performance change reaches a level that is predetermined by the vehicle driver.

(4) The electromagnetic suspension system according to mode (2) or (3), wherein the comparison-based performance-change detecting portion includes a performance-change-presence detecting portion that is configured, when a value related to an average of an absolute value of a ratio between the estimated value and the actual value of the absorber-expansion/contraction-related amount over a predetermined time period is outside a predetermined range, to detect that the performance of the electromagnetic suspension unit is changed.

When the value (average expansion/contraction-related-amount ratio value) related to the average of the absolute value of the ratio between the estimated and actual values over the predetermined time period is deviated from the predetermined range, it is possible to consider that the performance is changed. For example, the average expansion/contraction-related-amount ratio value between the actual and the estimated values may be a value related to the average [|A*/A'|] of the absolute value [|A*/A'|] of the actual value divided by the estimated value, so that it can be detected that the performance is changed when the value related to the average [|A*/A'|] is larger than an upper limit of the predetermined range or is smaller than a lower limit of the predetermined range.

In the following modes, too, the judgment based on the difference may be used in place of the judgment based on the ratio, although it will not be described in the following modes.

Further, the average of the absolute value of the difference between the actual and estimated values may be used in place of the absolute value of the difference between the average of the absolute value of the actual value and the average of the absolute value of the estimated value. The average of the absolute value of the ratio between the actual and estimated values may be used in place of the absolute value of the ratio between the average of the absolute value of the actual value and the average of the absolute value of the estimated value.

For example, (i) comparing the average expansion/contraction-related-amount difference value (e.g., $\Sigma|A*-A'|$) of the difference between the actual value A* and estimated value A', to the threshold value may be replaced by (ii) comparing an absolute value $|\Sigma|A*|-\Sigma|A'||$ of a difference between a value (hereinafter referred to as average expansion/contraction-related-amount actual value) $\Sigma|A*|$ representing the average of the absolute value of the actual value over a predetermined time period and a value (hereinafter referred to as average expansion/contraction-related-amount estimated value) $\Sigma|A'|$ representing the average of the absolute value of the estimated value over the predetermined time period, to the threshold value. Further, (a) the average expansion/contraction-related-amount ratio value (|A*/A'| or |A'/A*|) between the actual and estimated values may be replaced by a ratio (|A*|/|A'| or |A'|/|A*|) between the average expansion/contraction-related-amount actual value and the average expansion/contraction-related-amount estimated value.

(5) The electromagnetic suspension system according to any one of modes (2) through (4), wherein the comparison-based performance-change detecting portion includes a portion that is configured, when a value related to an average of an absolute value of the actual value of the absorber-expansion/contraction-related amount over a predetermined time period is larger than a value related to an average of an absolute value of the estimated value of the absorber-expansion/contraction-related amount over the predetermined time period, to detect that (i) a state in which performance of the shock absorber is changed such that resistance acting against the expansion/contraction of the shock absorber is reduced and/or (ii) a state in which performance of performance of the electric actuator is changed such that resistance acting against expansion/contraction of the electric actuator is increased.

When the average expansion/contraction-related-amount actual value (including the actual value or the like) of the absorber-expansion/contraction-related amount is larger than the average expansion/contraction-related-amount estimated value (including the estimated value or the like) of the absorber-expansion/contraction-related amount, there are a case in which the resistance in the shock absorber is deficient or smaller than that in the standard performance and a case in which the resistance in the electric actuator is larger than that in the standard performance. When the resistance in the electric actuator is made large, the expansion/contraction of the electric actuator is made difficult whereby the shock absorber is caused to expand and contract by an increased amount corresponding to the difficulty of the expansion/contraction of the electric actuator.

(6) The electromagnetic suspension system according to any one of modes (2) through (5), wherein the comparison-based performance-change detecting portion includes an expansion/contraction-resistance deficiency detecting portion that is configured, when a value related to an average of an absolute value of the actual value of the absorber-expansion/contraction-related amount over a predetermined time period is larger than an expansion/contraction-resistance deficiency threshold value that is dependent on a value related to an average of an absolute value of the estimated value of the absorber-expansion/contraction-related amount over the predetermined time period, to detect that performance of the shock absorber is changed such that resistance acting against the expansion/contraction of the shock absorber is reduced.

When the average expansion/contraction-related-amount actual value related to the average of the absolute value of the actual value of the absorber-expansion/contraction-related amount is larger than the expansion/contraction-resistance deficiency threshold value that is determined depending on the average expansion/contraction-related-amount estimated value related to the average of the absolute value of the estimated value of the absorber-expansion/contraction-related amount, it is judged that the performance of the shock absorber is changed such that the resistance acting against the expansion/contraction of the shock absorber is reduced. The expansion/contraction-resistance deficiency threshold value may be a value equal to a sum of the average expansion/contraction-related-amount estimated value and a predetermined value that is not smaller than 0, or may be a value equal to a product of the average expansion/contraction-related-amount estimated value and a value that is not smaller than 1.

It is preferable that this judgment is made when the performance change of the electric actuator is not detected (when the resistance acting against the expansion/contraction of the electric actuator is not increased).

The resistance acting against the expansion/contraction of the shock absorber is generated by cooperation of damping force generated in the shock absorber and friction acting between the piston and the cylinder body of the shock absorber, or by cooperation of the damping force, the friction and spring force generated by a spring where the spring is disposed in parallel with the shock absorber. Therefore, it is considered that the resistance is reduced, for example, when the damping force is reduced, when the friction between the piston and the cylinder body is reduced due to factor such as wear of a sealing member, or when a spring coefficient of the spring is reduced. Further, it is considered that the deficiency of the damping force (which is that the damping force generated upon the same expansion/contraction velocity is made smaller than that in the standard performance) is caused due to, for example, liquid leakage, gas removable and deterioration of working fluid (oil).

On the other hand, where the resistance generated in the shock absorber is referred to as the damping force, the performance change causing deficiency of the expansion/contraction resistance can be referred to as the performance change causing deficiency of the damping force.

(7) The electromagnetic suspension system according to any one of modes (2) through (6), wherein the comparison-based performance-change detecting portion includes a portion that is configured, when a value related to an average of an absolute value of the actual value of the absorber-expansion/contraction-related amount over a predetermined time period is smaller than a value related to an average of an absolute value of the estimated value of the absorber-expansion/contraction-related amount over the predetermined time period, to detect that (i) a state in which performance of the shock absorber is changed such that resistance acting against the expansion/contraction of the shock absorber is increased and/or (ii) a state in which performance of performance of the electric actuator is changed such that resistance acting against expansion/contraction of the electric actuator is reduced.

When the average expansion/contraction-related-amount actual value is made smaller than the average expansion/contraction-related-amount estimated value, there are a case in which the expansion/contraction resistance in the shock absorber is increased and a case in which the resistance in the electric actuator is reduced. When the resistance in the electric actuator is made small, the expansion/contraction of the electric actuator is made easy.

(8) The electromagnetic suspension system according to any one of modes (2) through (7), wherein the comparison-based performance-change detecting portion includes a free-tendency performance-change detecting portion that is configured, when a value related to an average of an absolute value of the actual value of the absorber-expansion/contraction-related amount over a predetermined time period is smaller than a free-tendency performance-change threshold value that is dependent on a value related to an average of an absolute value of the estimated value of the absorber-expansion/contraction-related amount over the predetermined time period, to detect that performance of the electric actuator is changed such that the electric actuator becomes closer to a free state.

When the average expansion/contraction-related-amount actual value is smaller than the average expansion/contraction-related-amount estimated value, it is detected that the performance of the electric actuator is changed such that the electric actuator becomes closer to the free state.

It is preferable that this judgment is made when the shock absorber is in a normal state (when it is not detected that the performance of the shock absorber is changed such that the resistance acting against the expansion/contraction of the shock absorber is increased).

Where the electromagnetic suspension unit is designed such that, mainly, the electric actuator is caused to expand or contract upon application of vibration of a low frequency, it is appropriate to consider that the performance of the electric actuator is changed such that the electric actuator becomes closer to the free state when the actual value or the like of the absorber-expansion/contraction-related amount upon application of the low frequency vibration is smaller than the estimated value or the like of the absorber-expansion/contraction-related amount upon application of the low frequency vibration, or when a low-frequency component of the actual value or the like of the absorber-expansion/contraction-related amount is smaller than a low-frequency component of the estimated value or the like of the absorber-expansion/contraction-related amount. The detection can be made by using, for example, the actual value or the like and estimated value or the like of the absorber-expansion/contraction-related amount upon application of the low frequency vibration, or the actual value or the like and estimated value or the like of a low-frequency component of the absorber-expansion/contraction-related amount (which component is extracted by subjecting the related amount to a filter processing, a Fourier transform or the like). The detection can be made also by using the actual value or the like and estimated value or the like of the absorber-expansion/contraction-related amount upon application of vibration of a high frequency, or the actual value or the like and estimated value or the like of a high-frequency component of the absorber-expansion/contraction-related amount.

For example, where the electric actuator includes an electric motor and a motion converting mechanism, the electric actuator is placed in the free state when the electric motor is placed in a free state due to, for example, disconnection of electric cable.

(9) The electromagnetic suspension system according to any one of modes (2) through (8), wherein the comparison-based performance-change detecting portion includes an expansion/contraction-resistance increase detecting portion that is configured, when a value related to an average of an absolute value of the actual value of the absorber-expansion/contraction-related amount over a predetermined time period is smaller than a resistance-increase threshold value that is dependent on a value related to an average of an absolute value of the estimated value of the absorber-expansion/contraction-related amount over the predetermined time period, to detect that performance of the shock absorber is changed such that resistance acting against the expansion/contraction of the shock absorber is increased.

When the average expansion/contraction-related-amount actual value is smaller than the resistance-increase threshold value that is determined depending on the average expansion/contraction-related-amount estimated value, it is judged that the performance of the shock absorber is changed such that the expansion/contraction resistance in the shock absorber is increased. It is preferable that this judgment is made when the electric actuator is in a normal state (when it is not detected that the performance of the electric actuator is changed such that the resistance acting against the expansion/contraction of the electric actuator is reduced).

It is considered that the increase of the expansion/contraction resistance in the shock absorber could be caused by, for example, increase of the damping force and increase of the friction acting between the piston and the cylinder body. It is considered that the increase of the damping force and the increase of the friction could be caused by, for example, when a communication passage of a damping-force generating mechanism is partially or entirely closed as a result of entrance of foreign matters into the communication passage, when the friction is increased by rust of the piston and the cylinder body, and when movement of the piston itself is made difficult by foreign matters.

On the other hand, in most cases, the shock absorber is designed to be caused to easily expand and compress by vibration of a high frequency. It is therefore preferable to use the actual value or the like and estimated value or the like of the absorber-expansion/contraction-related amount upon application of the high frequency vibration, or use a high-frequency component of the actual value or the like and a high-frequency component of the estimated value or the like of the absorber-expansion/contraction-related amount, where the average expansion/contraction-related-amount actual value and the average expansion/contraction-related-amount estimated value are compared to each other.

(10) The electromagnetic suspension system according to any one of modes (1) through (9), wherein the performance-change detecting device includes a performance-changed-portion specifying portion that is configured, when it is detected that the electromagnetic suspension unit is changed, to specify a performance changed portion of the electromagnetic suspension unit (a portion of the electromagnetic suspension unit whose performance is changed), based on at least one of an actual value of an electric-operation-related amount, an actual value of a sprung-portion-movement-related amount and an actual value of a sprung/unsprung-portions-distance-related amount, and wherein the electric-operation-related amount includes at least one of amount and velocity of movement of the electric actuator in the vertical direction, the sprung-portion-movement-related amount includes at least one of amount and velocity of movement of a sprung portion of the vehicle in the vertical direction, and the sprung/unsprung-portions-distance-related amount includes at least one of amount and velocity of change of distance between the body-side portion and the wheel-side portion of the vehicle in the vertical direction.

The performance changed portion can be specified based on at least one of the actual values or the like of the electric-operation-related amount, sprung-portion-movement-related amount and sprung/unsprung-portions-distance-related amount. Further, the performance changed portion can be specified by comparing the actual value or the like and the estimated value or the like of the electric-operation-related amount, comparing the actual value or the like and the estimated value or the like of the sprung-portion-movement-related amount, and/or comparing the actual value or the like and the estimated value or the like of the sprung/unsprung-portions-distance-related amount.

Where the performance changed portion of the electromagnetic suspension unit can be specified, for example, it is enough to replace a part or parts constituting the performance changed portion by a new part or parts, thereby eliminating necessity of replacing the electromagnetic suspension unit as a whole by a new electromagnetic suspension unit, and accordingly making it possible to reduce cost required for the replacement. Further, where the performance changed portion can be specified, it is convenient for repairing the electromagnetic suspension unit.

The amount of the operation of the electric actuator is an amount of operation from a reference operating position. Therefore, since an length of the electric actuator and the operation amount of the electric actuator have an one-to-one relationship, the length of the electric actuator is also included in the electric-operation-related amount. The length of the electric actuator may be, for example, a sum of a length of a main body of the actuator and a protruding amount by which an output member of the actuator protrudes from the main body of the actuator.

Further, the electric-operation-related amount may be referred also to as an electric-expansion/contraction-related amount. This is because, where the electric actuator includes an electric motor and a motion converting mechanism, the motion converting mechanism is activated whereby the vertical length of the electric actuator is changed, even without supply of an electric power to the electric actuator.

Further, the movement amount of the sprung portion is an amount of movement of the sprung portion from its reference position, namely, displacement of the sprung portion. The movement velocity of the sprung portion is a differential (absolute velocity) of the displacement of the sprung portion with respect of time, and can be obtained irrespective of the reference position of the sprung portion.

Similarly, the amount of change of the distance between the body-side portion and the wheel-side portion is an amount of change from a distance between the body-side portion and the wheel-side portion when they are positioned in their reference positions. Therefore, the distance between the body-side portion and the wheel-side portion is also included in the sprung/unsprung-portions-distance-related amount.

(11) The electromagnetic suspension system according to mode (10), wherein the performance-changed-portion specifying portion includes a first lock-tendency-change detecting portion that is configured, when an average expansion/contraction-related-amount actual value related to an average of an absolute value of the electric-operation-related amount over a predetermined time period is smaller than a first-lock-tendency-change threshold value, to detect that a performance of the electric actuator is changed such that the electric actuator becomes closer to a lock state.

When the actual value of the electric-operation-related amount of the electric actuator is smaller than the first-lock-tendency-change threshold value, it is detected that the performance of the electric actuator is changed such that the resistance in the electric actuator is increased.

Where the electric actuator includes an electric actuator and a motion converting mechanism, it is considered that the resistance in the electric actuator is increased, for example, when the electric motor is placed in its lock state (in which relative rotation of a screw shaft and a nut portion of the motion converting mechanism is disabled), and when friction acting between the screw shaft and the nut portion of the motion converting mechanism is made large. It is noted that the first-lock-tendency-change threshold value may be either a predetermined fixed value (absolute lock-tendency-change threshold value) or a value (relative lock-tendency-change threshold value) that is dependent on a value related to an average of an absolute value of an estimated value of the electric-operation-related amount over the predetermined time period.

This judgment may be made either when the electric actuator is being controlled in accordance with a predetermined rule or when the actuator is not being controlled. Where the electric actuator includes an electric motor, the damping force is generated by the electric motor when the electric actuator is not being controlled.

(12) The electromagnetic suspension system according to any one of modes (2)-(11), wherein the performance-change detecting device includes at least one of:

(x) a portion that is configured, when a value related to an average of an absolute value of a difference between an estimated value and an actual value of a sprung/unsprung-portions-distance-related amount over a predetermined time period is larger than a particular threshold value, upon detection of change of the performance of the electromagnetic suspension unit by the comparison-based performance-change detecting portion, to detect that performance of the electric actuator is changed such that the electric actuator becomes closer to a free state; and (y) a portion that is configured, when the value related to the average of the absolute value of the difference between the estimated value and the actual value of the sprung/unsprung-portions-distance-related amount over the predetermined time period is not larger than the particular threshold value, upon detection of change of the performance of the electromagnetic suspension unit by the comparison-based performance-change detecting portion, to detect that the performance of the shock absorber is changed such that resistance acting against the expansion/contraction of the shock absorber is increased, and wherein the sprung/unsprung-portions-distance-related amount includes at least one of amount and velocity of change of distance between the body-side portion and the wheel-side portion.

As described above, either when the performance of the electric actuator is changed such that the actuator becomes closer to the free state or when the performance of the shock absorber is changed such that the resistance in the absorber is increased, the average absorber expansion/contraction-related-amount actual value becomes smaller than the average absorber expansion/contraction-related-amount estimated value so that a difference between the actual value and estimated value is reduced whereby the performance change is detected.

On the other hand, where the electromagnetic suspension unit is designed such that the shock absorber and the electric actuator are disposed in series with each other and such that the expansion/contraction-related amount of the shock absorber is made smaller than the electric operation amount of the electric actuator, the difference between the actual value or the like and the estimated value or the like of the sprung/unsprung-portions-distance-related amount is not so increased when the performance of the shock absorber is changed such that the resistance is increased, but is increased when the performance of the electric actuator is changed such that the electric actuator becomes closer to the free state.

Therefore, when the value related to the average of the difference between the estimated value and actual value of the sprung/unsprung-portions-distance-related amount is small, it can be judged that the performance of the shock absorber is changed such that the resistance is increased. When the value related to the average of the difference between the estimated value and actual value of the sprung/unsprung-portions-distance-related amount is large, it can be judged that the performance of the electric actuator is changed such that the electric actuator becomes closer to the free state.

It is noted that, when the value related to the average of the difference between the estimated value and actual value of the sprung/unsprung-portions-distance-related amount is large, there is a possibility that the performance of the electric actuator is changed such that the electric actuator becomes closer to the free state while the performance of the shock absorber is changed such that the resistance is increased. However, since it is considered that a possibility of simultaneous occurrence of the performance change in two portions is extremely low, it is possible to judge that the performance of the electric actuator is changed when the value related to the average of the difference between the estimated value and actual value of the sprung/unsprung-portions-distance-related amount is large. On the other hand, it is also possible to detect whether the performance of the shock absorber is changed or not, by using other method. For example, it is possible to detect that the performance of the shock absorber as well as the performance of the electric actuator is changed when the average absorber-expansion/contraction-related-amount actual value is smaller than a resistance-increase threshold value that is dependent on a value related to the average absorber-expansion/contraction-related-amount estimated value upon application of vibration of a high frequency.

(13) The electromagnetic suspension system according to any one of modes (1)-(12), wherein the hydraulic shock absorber and the electric actuator are disposed between the body-side portion and the wheel-side portion, in series with each other via an intermediate member.

The shock absorber includes a cylinder body and a piston that is slidably fitted in the cylinder body such that one of the cylinder body and a piston rod of the piston is connected to one of the body-side portion and the wheel-side portion while the other of the cylinder body and the piston rod is connected to an output shaft of the electric actuator. The one of the cylinder body and the piston rod and the one of the body-side portion and the wheel-side portion are connected to each other, in principle, vertically unmovably relative to each other. A main body of the electric actuator and the other of the body-side portion and the wheel-side portion are connected to each other, in principle, vertically unmovably relative to each other. It is noted that, in most cases, a suspension spring is disposed between the body-side portion and the wheel-side portion, in parallel with the shock absorber and electric actuator that are connected in series with each other.

Further, there is a case where a connecting member (intermediate member) is disposed between the shock absorber and the electric actuator.

(14) The electromagnetic suspension system according to any one of modes (1)-(13), wherein the electric actuator includes an electric motor and a motion converting mechanism such that a fixed portion of the electric motor is attached to the body-side portion while a rotatable portion of the electric motor is connected to the shock absorber through the motion converting mechanism.

It is preferable that the motion converting mechanism is a ball screw mechanism including a screw rod, a nut portion and balls disposed between the screw rod and the nut portion. The expansion/contraction resistance in the electric actuator can be made small by the ball screw mechanism.

(15) The electromagnetic suspension system according to any one of modes (1)-(14), wherein the performance-change detecting device includes an estimating portion that is configured to estimate at least one of an intermediate-member-movement-related amount and a sprung-portion-movement-related amount, and wherein the intermediate-member-movement-related amount includes at least one of amount and velocity of movement of the intermediate member in the vertical direction while the sprung-portion-movement-related amount includes at least one of amount and velocity of movement of the sprung portion of the vehicle in the vertical direction.

Each of the movement amount of the intermediate member and the movement amount of the sprung portion is an amount of movement (displacement) thereof from its reference position. The sprung portion of the vehicle, whose movement amount or velocity is estimated, may be provided by either a member that provides the body-side portion (to which the electromagnetic suspension unit is attached) or other member.

(16) The electromagnetic suspension system according to mode (15), wherein the estimating portion includes an observer that is configured to estimate at least one of (x) the intermediate-member-movement-related amount and (y) the sprung-portion-movement-related amount, based on (i) actual values of an amount and a velocity of movement of the unsprung portion of the vehicle in the vertical direction and (ii) an actual value of a vertical force applied by the electric actuator, in accordance with a predetermined model prepared for the electromagnetic suspension unit.

Where the shock absorber and the electric actuator are disposed between the wheel-side portion and the body-side portion, in series with the each other through the intermediate member, the movement amount and velocity of the sprung portion and the output of the electric actuator are inputted into expressions of the model, and the movement amount (displacement) and movement velocity (absolute velocity) of the intermediate member and the movement amount (displacement) and movement velocity (absolute velocity) of the sprung portion are estimated by the observer.

The expansion/contraction amount and expansion/contraction velocity of the shock absorber can be estimated based on the estimated movement amount and velocity of the intermediate member, and the amount and velocity of change of the distance between the sprung and unsprung portions can be estimated based on the estimated movement amount and velocity of the sprung portion. Further, the operation amount of the electric actuator and a velocity of change of the operation amount of the electric actuator can be estimated on the movement amount and velocity of the intermediate member and the movement amount and velocity of the sprung portion.

The unsprung portion of the vehicle may be provided by either a member that provides the wheel-side portion (to which the electromagnetic suspension unit is attached) or other member.

(17) The electromagnetic suspension system according to mode (15) or (16), wherein the performance-change detecting device includes: (a) an intermediate-member-movement-related amount obtaining portion that is configured to obtain an actual value of the intermediate-member-movement-related amount, based on an actual value of the absorber-expansion/contraction-related amount and an actual value of an unsprung-portion-movement-related amount that includes at least one of amount and velocity of movement of the unsprung portion of the vehicle in the vertical direction; and (b) an intermediate-member-movement-based performance-change detecting portion that is configured, when a value related to an average of a difference between the actual value of the intermediate-member-movement-related amount and the estimated value of the intermediate-member-movement-related amount over a predetermined time period is larger than a predetermined intermediate-member-movement-based threshold value, to detect that the performance of the electromagnetic suspension unit is changed.

When the absolute value of the difference between the actual value or the like and the estimated value or the like of the intermediate-member-movement-related amount is large, it can be judged that the performance of the electromagnetic suspension unit is changed. The intermediate member may be connected, for example, to either one of the cylinder body and the piston rod of the shock absorber and also to the output member of the electric actuator.

(18) The electromagnetic suspension system according to any one of modes (15)-(17), wherein the absorber-expansion/contraction-related amount estimating portion includes an intermediate-member-movement-based expansion/contraction-related-amount estimating portion that is configured to obtain an estimated value of the absorber-expansion/contraction-related amount, based on the estimated value of the intermediate-member-movement-related amount that is estimated by the estimating portion and an actual value of an unsprung-portion-movement-related amount that includes at least one of amount and velocity of movement of the unsprung portion of the vehicle in the vertical direction.

The estimated value of the absorber-expansion/contraction-related amount can be obtained by subtracting the movement amount and velocity of the unsprung portion from the estimated movement amount and velocity of the intermediate member.

(19) The electromagnetic suspension system according to any one of modes (15)-(18), wherein the performance-change detecting device includes: (a) an electric-operation-related-amount estimated-value obtaining portion that is configured to obtain an estimated value of an electric-operation-related amount that includes at least one of amount and velocity of operation of the electric actuator, by subtracting an estimated value of the intermediate-member-movement-related amount, from an estimated value of the sprung-portion-movement-related amount estimated by the estimating portion; and (b) a second lock-tendency-change detecting portion that is configured, when an average expansion/contraction-related-amount actual value related to an average of an absolute value of the electric-operation-related amount over a predetermined time period is smaller than a second-lock-tendency-change threshold value that is dependent on an average expansion/contraction-related-amount estimated value related to an average of an estimated value of the electric-operation-related amount over a predetermined time period, which is estimated by the electric-operation-related-amount estimated-value obtaining portion, to detect that a performance of the electric actuator is changed such that the electric actuator becomes closer to a lock state.

The electric-operation-related amount of the electric actuator can be obtained based on the sprung-portion-movement-related amount and the intermediate-intermediate-member-movement-related amount.

(20) The electromagnetic suspension system according to any one of modes (2)-(19), wherein the actual absorber-expansion/contraction-related amount obtaining portion includes an actual expansion/contraction-related-amount calculating portion that is configured to obtain an actual value of the absorber-expansion/contraction-related amount, based on an actual value of sprung/unsprung-portions-distance-related amount and an actual value of an electric-operation-related amount, and wherein the actual value of the sprung/unsprung-portions-distance-related amount includes at least one of amount and velocity of change of a distance between the body-side portion and the wheel-side portion, while the actual value of the electric-operation-related amount includes at least one of amount and velocity of operation of the electric actuator.

Where the shock absorber and the electric actuator are disposed between the wheel-side portion and the body-side portion, in series with each other, an amount of movement of the piston relative to the cylinder body has to be detected for detecting the expansion/contraction amount of the shock absorber. However, it is common that no sensor is provided for detecting the amount of the movement of the piston relative to the cylinder body. On the other hand, the expansion/contraction of the shock absorber cannot be detected by a vehicle height sensor. In the electromagnetic suspension system described in the present mode, the expansion/contraction of the shock absorber is detected by using detected values detected by two or more sensors.

For example, the actual value of the sprung/unsprung-portions-distance-related amount is obtained based on a detected value detected by a vehicle height sensor, while the actual value of the electric-operation-related amount is obtained based on a detected value detected by a sensor that is configured to detect an amount of operation of the electric actuator, and the actual value of the expansion/contraction-related amount of the shock absorber is obtained by subtracting the actual value of the electric-operation-related amount from the actual value of the sprung/unsprung-portions-distance-related amount.

Further, the actual value of the sprung/unsprung-portions-distance-related amount can be obtained based on an actual value of the sprung-portion-movement-related amount and an actual value of the unsprung-portion-movement-related amount. The sprung/unsprung-portions-distance-related amount, sprung-portion-movement-related amount and unsprung-portion-movement-related amount cooperate with one another to establish a predetermined relationship among them, so that one of them can be obtained if the other two of them have been obtained. Hereinafter, the "actual value" described in the present specification means various actual values such as an actual value that is detected directly by a single sensor, a calculated value (e.g., differential, integral) that is calculated based on a detected value detected by a single sensor, and a calculated value that is calculated based on detected values detected by a plurality of sensors.

(21) The electromagnetic suspension system according to any one of modes (1)-(20), wherein the performance-change detecting device includes a performance-change-level detecting portion that is configured to detect in which one of a plurality of levels the performance change of the electromagnetic suspension unit is currently found.

Where the level of the performance change can be detected in a plurality of stages, it is convenient since it is possible to know time to replace the suspension unit and time to repair the suspension unit. Further, the detection of the performance change level is effective to assess the performance change over a certain time period.

(22) The electromagnetic suspension system according to any one of modes (1)-(21), including an informing portion that is configured to inform result of detection of the performance change of the electromagnetic suspension unit which is made by the performance-change detecting device.

(23) The electromagnetic suspension system according to any one of modes (1)-(22), wherein the electromagnetic suspension unit is provided for each of front right, front left, rear right and rear left wheels of the vehicle, so that a plurality of electromagnetic suspension units each of which is the electromagnetic suspension unit are provided for the respective wheels, and wherein the performance-change detecting device includes a wheels-comparison-based performance-change detecting portion that is configured to detect a performance change of the shock absorber provided for each of the front right, front left, rear right and rear left wheels, by comparing average expansion/contraction-related-amount actual values each of which is obtained by the actual absorber-expansion/contraction-related amount obtaining portion and each of which is of a corresponding one of the plurality of electromagnetic suspension units, each of the average expansion/contraction-related-amount actual values being related to an average of an absolute value of an actual value of the absorber-expansion/contraction-related amount over a predetermined time period.

(24) The electromagnetic suspension system according to mode (23), wherein the wheels-comparison-based performance-change detecting portion includes at least one of (a) a portion that is configured, when a corresponding one of the average expansion/contraction-related-amount actual values, which is of the hydraulic shock absorber provided for an assessed one of the wheels, is lower than a lower limit of a predetermined range that is dependent on an average-related value of the average expansion/contraction-related-amount actual values which are of hydraulic shock absorbers provided for the respective front right, front left, rear right and rear left wheels, to detect that the performance of the shock absorber provided for the assessed one of the wheels is changed such that the expansion/contraction resistance is increased, and (b) a portion that is configured, when the corresponding one of the average expansion/contraction-related-amount actual values is larger than an upper limit of the predetermined rage, to detect that the performance of the shock absorber is changed such that the expansion/contraction resistance is reduced.

The performance change of each of the shock absorbers provided for the respective four wheels can be detected by comparing the actual values of the expansion/contraction-related amounts of the respective shock absorber provided for the respective four wheels.

This detection can be made on condition that the performance of the electric actuator is not changed.

(25) The electromagnetic suspension system according to according to any one of modes (1)-(23), wherein the electromagnetic suspension unit is provided for each of front right, front left, rear right and rear left wheels of the vehicle, so that a plurality of electromagnetic suspension units, each of which is the electromagnetic suspension unit, and a plurality of electric actuators, each of which is the electric actuator, are provided for the respective wheels, and wherein the performance-change detecting device includes an electric-operation-related-amount obtaining portion that is configured to obtain actual values of electric-operation-related amounts each including at least one of amount and velocity of operation of a corresponding one of the electric actuators; and an electric-actuator-performance-change detecting portion that is configured to detect change of performance of each of the electric actuators, by comparing the actual values of electric-operation-related amounts to each other.

By comparing the actual values of the like of the electric-operation-related amounts to each other, it is possible to detect the performance change of each of the electric actuators.

(26) The electromagnetic suspension system according to according to mode (25), the electric-actuator-performance-change detecting portion includes at least one of (a) a portion configured, when an average expansion/contraction-related-amount actual value, which is related to an average of the electric-operation-related amount of the electric actuator provided for an assessed one of the front right, front left, rear right and rear left wheels of the vehicle is lower that a lower limit of a predetermined range which is dependent on an average-related value of values related to averages of the respective electric-operation-related amounts, to detect that the performance of the electric actuator provided of the assessed one of the wheel is changed such that the same electric actuator becomes closer to a lock state, and (b) a portion configured, when the average expansion/contraction-related-amount actual value is higher than an upper limit of the predetermined range, to detect that the performance of the electric actuator provided of the assessed one of the wheel is changed such that the same electric actuator becomes closer to a free state.

(27) The electromagnetic suspension system according to any one of modes (1)-(9) and (20)-(26), wherein the hydraulic shock absorber and the electric actuator are disposed between the body-side portion and the wheel-side portion, in parallel with each other, and wherein the performance-change detecting device includes (a) a parallel-type absorber-expansion/contraction-related amount estimating portion that is configured to obtain an estimated value of the absorber-expansion/contraction-related amount, based on at least the vertical force applied by the electric actuator, and (b) a parallel-type performance-change detecting portion that is configured to detect the change of the performance of the electromagnetic suspension unit, by comparing the estimated value and actual value of the absorber-expansion/contraction-related amount.

When the expansion/contraction resistance in the shock absorber is made large, the actual values or the like is made smaller than the estimated value or the like. When the expansion/contraction resistance in the shock absorber is made small (namely, when the damping force is deficient due to liquid leakage or other factor), the actual values or the like is made larger than the estimated value or the like.

Further, when the performance of the electric actuator is changed such that the electric actuator becomes closer to the lock state, the actual value or the like of the expansion/contraction-related amount of the shock absorber is made smaller than the estimated value or the like of expansion/contraction-related amount of the shock absorber. When the performance of the electric actuator is changed such that the electric actuator becomes closer to the free state, the actual value or the like is made larger than the estimated value or the like.

Thus, it is possible to detect the performance change of the shock absorber and the performance change of the electric actuator in the electromagnetic suspension unit. It is noted that, commonly, a suspension spring is disposed in parallel with the electric actuator and shock absorber, between the body-side portion and wheel-side portion.

(28) An electromagnetic suspension system including:

an electromagnetic suspension unit which is provided for a wheel of a vehicle and which is disposed between a body-side portion and a wheel-side portion of the vehicle, the electromagnetic suspension unit including (a) a hydraulic shock absorber and (b) an electric actuator that is configured to apply a vertical force between the body-side portion and the wheel-side portion, the shock absorber and the electric actuator being disposed connected to each other and being disposed in series with each other via an intermediate member; and an estimating device that is configured, upon application of vibration to the electromagnetic suspension unit in a vertical direction, to estimate at least one of an intermediate-member-movement-related amount and a sprung-portion-movement-related amount, based on an actual value of amount of movement of an unsprung portion of the vehicle in the vertical direction, an actual value of velocity of the movement of the unsprung portion and an actual value of the vertical force, wherein the intermediate-member-movement-related amount includes at least one of amount and velocity of movement of the intermediate member in the vertical direction, while the sprung-portion-movement-related amount includes at least one of amount and velocity of movement of the sprung portion in the vertical direction.

By utilizing the estimated intermediate-member-movement-related amount and sprung-portion-movement-related amount, it is possible to obtain an estimated value of the absorber-expansion/contraction-related amount, an estimated value of the electric-operation-related amount and an estimated value of the sprung/unsprung-portions-distance-related amount. Then, by using these estimated values, it is possible to detect presence or absence of the performance change of the electromagnetic suspension unit and to specify in which portion of the electromagnetic suspension unit the performance is changed.

Further, the actual value of the vertical force applied by the electric actuator may be either a value obtained based on a control command value or a value obtained based on an actual value of electric current flowing through the electric actuator.

It is possible to employ technical feature described in any one of the above modes (1)-(27), in the electromagnetic suspension system described in this mode (28). For example, the detection of the presence of the performance change and the detection of the performance changed portion can be made by employing a part or parts extracted from the features described in the above modes (1)-(27).

BRIEF DESCRIPTION OF DRAWINGS

FIG. 4 An estimation model representing the above-described electromagnetic suspension unit.

BRIEF DESCRIPTION OF DRAWINGS

4: electromagnetic suspension unit, 16: electric actuator, 18: hydraulic shock absorber, 20: suspension spring, 50: electric motor, 77: screw mechanism, 78: cylinder body, 80: piston, 82: transmitting member, 84, 86: compression coil spring, 140: intermediate mass, 142: unsprung portion, 144: sprung portion, 150: sprung-portion acceleration sensor, 152: unsprung-portion acceleration sensor, 154: vehicle height sensor, 156: suspension ECU, 160: drive circuit, 162: rotational angle sensor, 164: ammeter, 168: informing portion

BEST MODE FOR CARRYING OUT THE INVENTION

Figure 1:
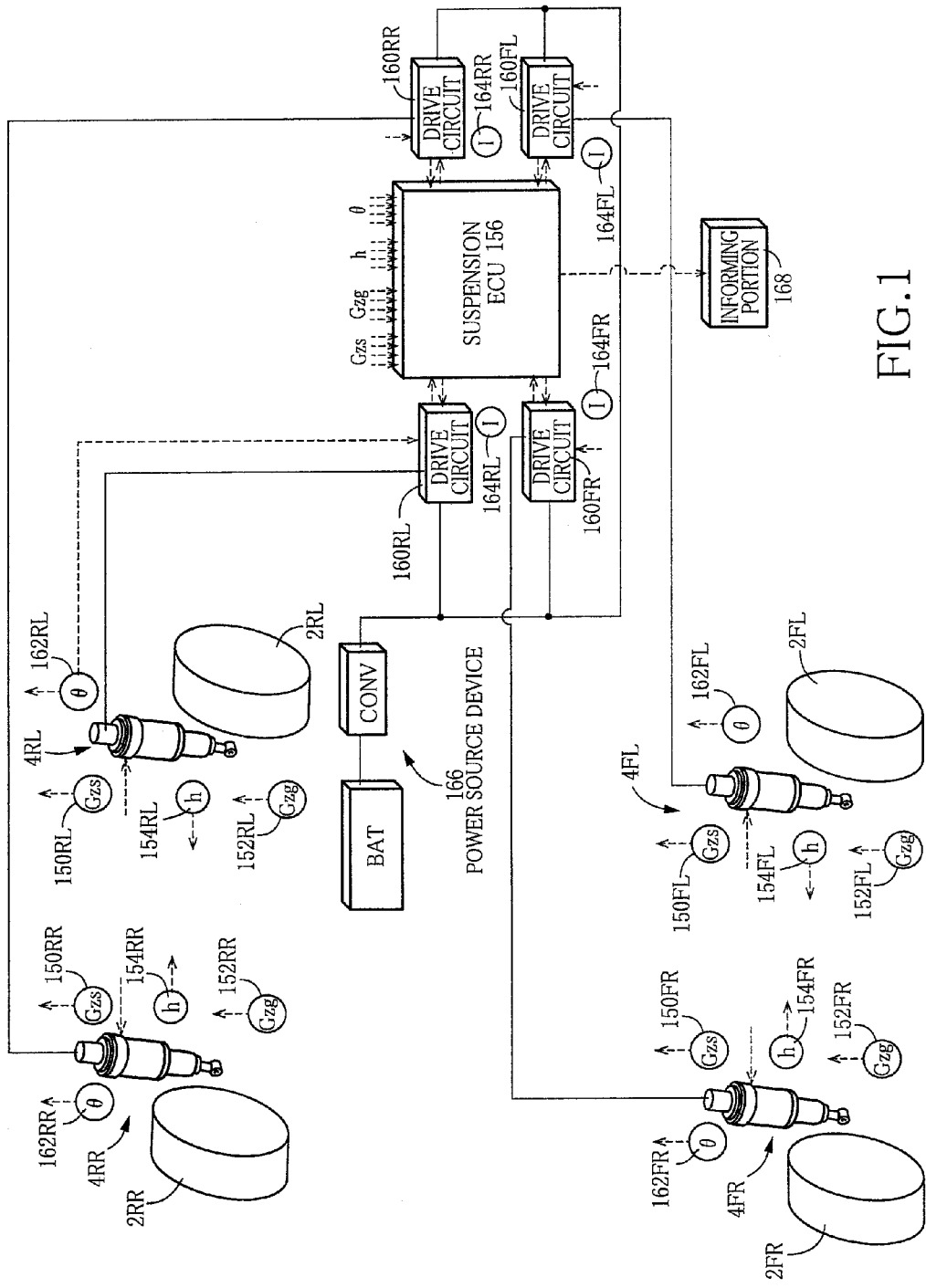
FIG. 1 A view conceptually showing an entirety of an electromagnetic suspension system that is an embodiment of the present invention.

FIG. 1 shows an electromagnetic suspension system that is an embodiment of the present invention. In the electromagnetic suspension system, electromagnetic suspension units 4FL, 4FR, 4RL, 4RR are provided for respective front right, front left, rear right and rear left wheels 2FL, 2FR, 2RL, 2RR of a vehicle, so as to be disposed between a wheel-side portion 12 (see FIG. 2) and a body-side portion 14 (see FIG. 2). In the following description, each of the suspension unit 4 and wheel 2, as well as the other components, will be referred without FR, FL, RR, RL indicative of the respective front right, front left, rear right and rear left wheels, where it does not have to be specified which one of the four wheels the referred component corresponds to.

Figure 2:
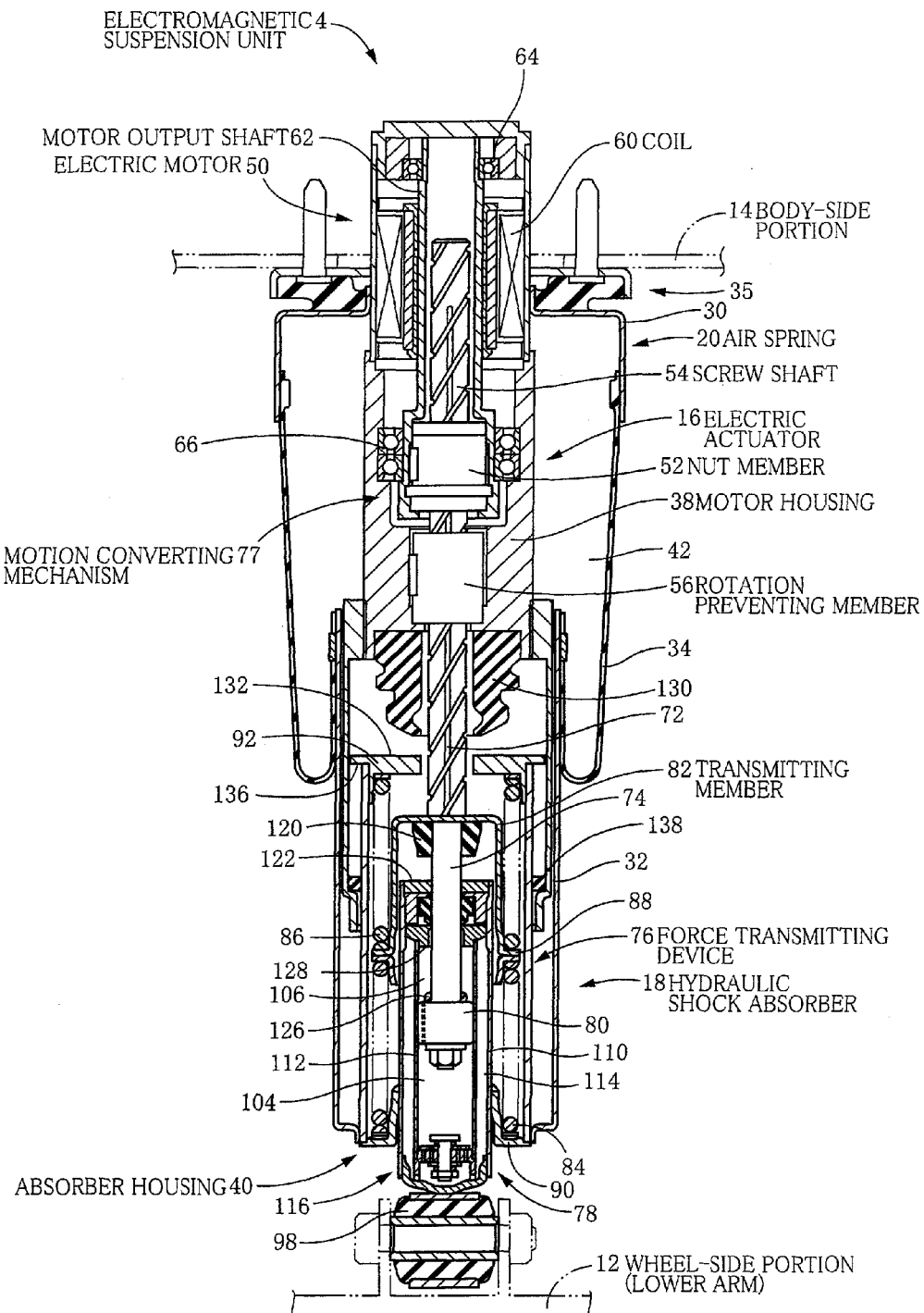
FIG. 2 A cross-sectional view of an electromagnetic suspension unit included in the above-described electromagnetic suspension system.

As shown in FIG. 2, each of the electromagnetic suspension units 4 is to be attached between a suspension lower arm (wheel-side portion) 12 that holds a corresponding one of the wheels 2 and a portion (body-side portion) 14 of a body of the vehicle, which corresponds to the corresponding wheel 2 and to which a corresponding one of the electromagnetic suspension units 4 is attached. The electromagnetic suspension unit 4 includes an electric actuator 16 configured to apply a vertical force, a hydraulic shock absorber 18, and an air spring 20 as an example of a suspension spring. The electric actuator 16 and the hydraulic shock absorber 18 are disposed between the wheel-side portion 12 and the body-side portion 14, in a series with each other and in parallel with the air spring 20.

The air spring 20 includes a chamber shell 30, an air piston cylinder 32 and a diaphragm 34 that is disposed between the chamber shell 30 and the air piston cylinder 32.

The chamber shell 30 is connected to the body-side portion 14 via a mount portion (including an elastic member) 35 such that, in principle, the chamber sheet 30 is immovable relative to the body-side portion 14 in a vertical direction. A housing (hereinafter referred to as motor housing) 38 of the electric actuator 16 is fixedly disposed inside the chamber shell 30.

The air piston cylinder 32 is fixed to a housing (hereinafter referred to as absorber housing) 40 of the hydraulic shock absorber 18, and the absorber housing 40 is connected to the lower arm 12 such that, in principle, the piston cylinder 32 is immovable relative to the lower arm 12 in the vertical direction. The air piston cylinder 32 is movable relative to the motor housing 38.

The diaphragm 34 is fixed at one of its opposite end portions to the chamber shell 30, and is fixed at the other end portions to the air piston cylinder 32. The chamber shell 30, diaphragm 34, air piston cylinder 32 and motor housing 38 cooperate with one another to define an air chamber (air room) 42.

The air chamber 42 is filled with a compressed air as an example of fluid, by which the vehicle body is elastically supported. By adjusting an amount of the compressed air stored in the air chamber 42, it is possible to adjust a vehicle height (stationary distance) that is a distance between the body-side portion 14 and the wheel-side portion 12.

The electric actuator 16 includes an electric motor 50, a nut member 52, a screw shaft 54 and a rotation preventing member 56, in addition to the above-described motor housing 38. The electric motor 50 includes a stator and a rotor such that the stator includes a plurality of coils 60 while the rotor takes the form of a motor output shaft 62 that is disposed radially inside the coils 60. The motor output shaft 62 has a plurality of magnet portions, and is supported by the motor housing 38 via bearings 64, 66 such that the output shaft 62 is rotatable relative to the motor housing 38. The nut member 52 is disposed radially inside the motor output shaft 62 that has a hollow cylindrical shape, and is held by the motor output shaft 62 such that the nut member 52 is unrotatable relative to the output shaft 62. It is noted that the magnet portions may be either disposed on an outer circumferential surface of the output shaft 62 or embedded in the outer circumferential surface of the output shaft 62.

The nut member 52 has an internally threaded portion in its inner circumferential surface such that a multiplicity of bearing balls are held in the internally threaded portion. The screw shaft 54 is provided to extend through inside the nut member 52, and has a thread groove and a plurality of axially-extending recessed portions 72 in its outer circumferential surface. The thread groove of the screw shaft 54 is held in thread engagement with the internally threaded portion of the nut member 52, through the above-described bearing balls. The screw shaft 54 penetrates through the nut member 52 and the rotation preventing member 56 such that the nut member 52 and the rotation preventing member 56 are held in engagement with an intermediate portion of the screw shaft 54. The screw shaft 54 is fixed at its lower end portion to a piston rod 74 of the hydraulic shock absorber 18, and is connected to the absorber housing 40 via a force transmitting device 76.

The rotation preventing member 56 is held by the motor housing 38 such that the rotation preventing member 56 is unrotatable relative to the motor housing 38. The rotation preventing member 56 has axially-extending protruding portions formed in its inner circumferential surface such that the axially-extending protruding portions are located in the same angular positions as the above-described axially-extending recessed portions 72 of the screw shaft 54. Thus, the screw shaft 54 is disposed radially inside the rotation preventing member 56, and is positioned relative to the rotation preventing member 56 in a circumferential position that causes the axially-extending recessed portions 72 to be engaged with the respective axially-extending protruding portions of the rotation preventing member 56. The rotation preventing member 56 inhibits rotation of the screw shaft 54 relative to the motor housing 38, and allows axial movement of the screw shaft 54 relative to the motor housing 38. Further, the rotation preventing member 56 has also a function for inhibiting lateral movement of the screw shaft 54.

In the present embodiment, the screw shaft 54, nut member 52 and rotation preventing member 56 cooperate with one another to constitute a motion converting mechanism 77 that is configured to convert a rotational motion to a linear motion. The motion converting mechanism 77 has a ball screw mechanism, and serves also as a force transmitting mechanism.

The hydraulic shock absorber 18 includes a piston 80 in addition to the above-described absorber housing 40, piston rod 74 and force transmitting device 76 that interconnects the screw shaft 54 and absorber housing 40. The piston 80 is slidably fitted in a cylinder body 78 which is included in the absorber housing 40 and which stores therein a working fluid.

The force transmitting device 76 includes a transmitting member 82 and compression coil springs 84, 86. The transmitting member 82 has a generally cylindrical shape, and is fixed at its bottom portion to the screw shaft 54. The transmitting member 82 includes a flange which is provided in an opening of its tubular portion and which constitutes an intermediate retainer 88. This intermediate retainer 88 is located between an upper retainer 92 and a lower retainer 90 that is fixed to the cylinder body 78. The compression coil spring 86 is disposed between the upper and intermediate retainers 92, 88. The compression coil spring 84 is disposed between the intermediate and lower retainers 88, 90. In the present embodiment, the upper retainer 92 is shaped to surround outer peripheries of the respective springs 84, 86. The upper retainer 92, cylinder body 78 and lower retainer 90 cooperate with one another to constitute the absorber housing 40. The absorber housing 40 is connected at the cylinder body 78 to the lower arm 12 via a mount portion 98 such that, in principle, the absorber housing 40 is unmovable relative to the lower arm 12 in the vertical direction.

On the other hand, an inner space of the cylinder body 78 is separated by the piston 80, into a lower chamber 104 and an upper chamber 106. A plurality of fluid passages are formed through the piston 80 so as to extend in the vertical direction.

By relative movement of the piston 80 and cylinder body 78, the working fluid is allowed to flow between the upper and lower chambers 106, 104.

The cylinder body 78 includes an outer sleeve 110 and an inner sleeve 112 which cooperate with each other to define therebetween a reservoir chamber 114. The piston 80 is slidably fitted in the inner sleeve 112. The working fluid is allowed to flow between the lower chamber 104 and the reservoir chamber 114 via fluid passages formed through a base valve body 116 that is disposed between the lower chamber 104 and the reservoir chamber 114.

In the hydraulic shock absorber 18, when the working fluid flows through the fluid passages provided in the piston 80 and base valve body 116, a damping force is applied between the wheel-side portion 12 and the body-side portion 14, wherein the damping force acts as a resistance force that is dependent on a velocity of flow of the working fluid through the fluid passages of the piston 80 and base valve body 116.

An elastic member 120 made of rubber or the like is disposed on a lower surface of the bottom portion of the transmitting member 82. This elastic member 120 cooperates with an outside upper surface 122 of the cylinder body 78 to constitute a damper-bound-side stopper. Another elastic member 126 made of rubber or the like is disposed on an upper surface of the piston 80. This elastic member 126 cooperates with an inside lower surface 128 of the cylinder body 78 to constitute a damper-rebound-side stopper. Still another elastic member 130 made of rubber or the like is disposed on a lower portion of the motor housing 38. This elastic member 130 cooperates with an upper surface 132 of the upper retainer 92 to constitute a suspension-bound-side stopper. Still another elastic member 138 made of rubber or the like is disposed on an inside protrusion portion of a connection member that is connected to the motor housing 38. This elastic member 138 cooperates with a lower surface 136 of the upper retainer 92 to constitute a suspension-rebound-side stopper.

Figure 3:
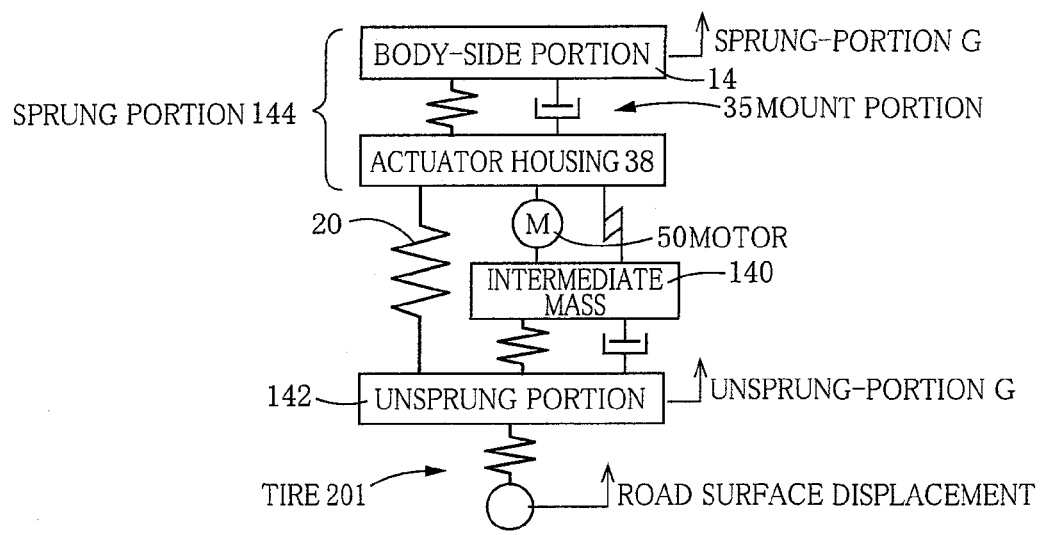
FIG. 3 A simulation model representing the above-described electromagnetic suspension unit.

In the present embodiment, the transmitting member 82 and screw shaft 54 cooperate with each other to constitute an intermediate mass 140 (see FIG. 3). The absorber housing 40, lower arm 12 and mount portion 98 cooperate with one another to constitute an unsprung portion 142, while the motor housing 38, shell 30, mount portion 35 and body-side portion 14 cooperate with one another to constitute a sprung portion 144.

A sprung-portion acceleration sensor 150, an unsprung-portion acceleration sensor 152 and a vehicle height sensor 154 are provided for each of the electromagnetic suspension units 4. The sprung-portion acceleration sensor 150 is configured to detect an absolute acceleration of a member of the sprung portion 144 in the vertical direction. The unsprung-portion acceleration sensor 152 is configured to detect an absolute acceleration of a member of the unsprung portion 142 in the vertical direction. The vehicle height sensor 154 is configured to detect a height of the vehicle which corresponds to a distance between the sprung and unsprung portions 144, 142. These sensors 150, 152, 154 are connected to a suspension ECU 156 that is constituted principally by a computer. Drive circuits 160, each of which is constituted principally by an inverter, are connected to the respective electric motors 50. To each of the drive circuits 160, there is connected a rotational angle sensor 162 that is configured to detect a rotational angle of a corresponding one of the electric motors 50. Each drive circuit 160 includes an ammeter 164, a switch circuit and a switch controlling portion that is configured to control the switch circuit. The switch circuit is controlled in accordance with commands supplied from the suspension ECU 156. The ammeter 164 is configured to detect an electric current flowing through the switch circuit, i.e., an electric current flowing through the electric motor 50. A power source 166 is connected to the drive circuits 160.

The computer constituting the suspension ECU 156 includes an execution portion, a storage portion and an input/output portion. The storage portion stores therein various programs such as a suspension control program and a performance inspection program. To the suspension ECU 156, an informing portion 168 is connected. The informing portion 168 includes at least one of an audio output portion, display and LED, and is configured to inform change of a performance of the electromagnetic suspension unit 4.

In the electromagnetic suspension system constructed as described above, the electric motor 50 of each electromagnetic suspension unit 4 is controlled to positively generate a force causing the sprung portion 144 and unsprung portion 142 to be moved toward and away from each other. For example, by causing the electric motor 50 to generate a damping force in accordance with a skyhook damper theory, it is possible to satisfactorily surprise vibration of the sprung portion 144 relative to the unsprung portion 142 in the vertical direction.

Figure 5:
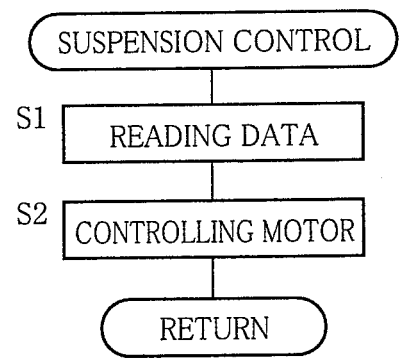
FIG. 5 A flow chart representing a suspension control program that is stored in a storage portion of a suspension ECU of the above-described electromagnetic suspension system.

FIG. 5 is a flow chart representing the suspension control program that is executed at a predetermined time interval.

In step 1 (hereinafter abbreviated as S1 as the other steps), data representing the sprung-portion acceleration, unsprung-portion acceleration and vehicle height are read. In S2, a target output of the electric motor 50 is calculated based on the data, and a control command value as a supply electric current value is determined in accordance with a predetermined rule. The determined control command value is outputted to the drive circuits 160. It is noted that the electric motor 50 may be controlled based on a running state of the vehicle. In such a case, the motor 50 is controlled based on, for example, a yaw rate, an operating angle of a steering wheel, a braking state and a driving state.

During running of the vehicle, each electromagnetic suspension unit 4 is caused to expand and contract depending on protrusions and recesses of a road surface, whereby a distance between the sprung portion 144 and unsprung portion 142 is changed.

The expansion/contraction of the electromagnetic suspension unit 4 includes expansion/contraction of the electric actuator 16 (relative movement of the intermediate mass 140 and sprung portion 144) and expansion/contraction of the hydraulic shock absorber 18 (relative movement of the cylinder body 78 and piston 80, which can be considered also relative movement of the intermediate mass 140 and unsprung 142).

The electromagnetic suspension unit 4 can be represented by a simulation model 200 of FIG. 3. In the simulation model 200, a tire 201 of the wheel 2 is present between a road surface and the unsprung portion 142, the air spring 20 is present between the unsprung portion 142 and the sprung portion 144, and the mount portion 35 is present between the motor housing 38 etc. and the body-side portion 14. The mount portion 35 is represented as a member that is equivalent to a spring and a damper which are disposed in parallel with the mount portion 35 (Voigt Model).

The electric motor 50 and motion converting mechanism 77 are present between the sprung portion 144 and the intermediate mass 140, so that a drive force and an inertial force of the electric motor 50 act between the sprung portion 144 and the intermediate mass 140. Further, the hydraulic shock absorber 18 and compression coil springs 84, 86 are present between the intermediate mass 140 and unsprung portion 142, so that the damper and the springs are disposed in parallel with one another.

The vibration of the unsprung portion 142, intermediate mass 140 and sprung portion 144, which would be caused as a result of change of the road surface, are simulated in accordance with this simulation model 200.

In the present embodiment, the performance change of each electromagnetic suspension unit 4 is detected. Further, a portion of the electromagnetic suspension unit 4 whose performance is deteriorated is specified.

An actual value (actually measured value) Vs* and an estimated value Vs' of an expansion/contraction velocity Vs of the hydraulic shock absorber 18 are compared to each other. The actual value Vs* is calculated based on a differential of a detected value H detected by the vehicle height sensor 154 and a differential of a product of lead L of the screw shaft 54 and a detected value θ* detected by the rotational angle sensor 162 (that is configured to detect a rotational angle θ from a reference position in the present embodiment). Thus, since no sensor is provided for detecting directly the expansion/contraction of the hydraulic shock absorber 18, the expansion/contraction velocity Vs* of the shock absorber 18 is calculated by using a plurality of detected values detected by respective sensors. In this sense, the actual value Vs* may be referred to as a calculated value.

$$Vs^* = dH^*/dt - L \cdot d\theta^*/dt \quad (1)$$

The estimated value Vs' is obtained by using an estimation model 210 shown in FIG. 4(a). In the estimation model 210, the body-side portion 14 and motor housing 38 or the like, which are shown in the simulation model 200, are treated as a single mass in the form of the sprung portion 144.

In the estimation model 210, a spring coefficient of the air spring 20 is represented by Kc, a coefficient of inertia acting between the sprung portion 144 and intermediate mass 140 is represented by Id, a spring coefficient of combination of the compression coil springs 84, 86 is represented by Ks, and a damping coefficient of the hydraulic shock absorber 18 is represented by Cs. Masses of the sprung portion 144, unsprung portion 142 and intermediate mass 140 are represented by $m_2$, $m_1$, $m_3$, respectively, and displacements of the sprung portion 144, unsprung portion 142 and intermediate mass 140 from their respective reference positions in the vertical direction are represented by $x_2$, $x_1$, $x_3$, respectively. Each of the reference positions in the vertical direction is a position in which a corresponding one of the sprung portion 144, unsprung portion 142 and intermediate mass 140 is being stopped during a free state of the electric motor 50.

Each of the inertial coefficient Id, constant coefficients Kc, Ks and damping coefficient Cs can be suitably set by a designer. For example, each of the coefficients Id, Kc, Ks, Cs can be set to a value within a normal range or a value of a brand-new state.

In the estimation model 210, an equation of motion with respect to the sprung portion 144 is represented by an expression (4b1) of FIG. 4(b), and an equation of motion with respect of the intermediate mass 140 is represented by an expression (4b2) of FIG. 4(b).

An elastic force $\{Kc \cdot (x_2 - x_1)\}$ generated by the air spring 20 is applied between the sprung portion 144 and unsprung portion 142. An inertial force $[Id\{(d^2x_2/dt^2) - (d^2x_3/dt^2)\}]$ and a vertical force Fm generated by the electric motor 50 are applied between the sprung portion 144 and intermediate mass 140. A product $\{m_2 \cdot (d^2x_2/dt^2)\}$ obtained by multiplying the mass $m_2$ of the sprung portion 144 by an acceleration $(d^2x_2/dt^2)$ of the sprung portion 144 is equalized to the applied forces, so that the expression (4b1) is established. Since the inertial force $[Id\{(d^2x_2/dt^2) - (d^2x_3/dt^2)\}]$ and the vertical force Fm are caused to act in respective directions opposite to each other, the vertical force Fm generated by the electric motor 50 acts as a resistance force against the inertial force $[Id\{(d^2x_2/dt^2) - (d^2x_3/dt^2)\}]$.

The inertial force $[Id\{(d^2x_2/dt^2) - (d^2x_3/dt^2)\}]$ and the vertical force Fm generated by the electric motor 50 are applied between the intermediate mass 140 and the sprung portion 144. An elastic force $\{Kc \cdot (x_3 - x_1)\}$ generated by the compression coil springs 84, 86 and a damping force $[Cs\{(dx_3/dt) - (dx_1/dt)\}]$ of the hydraulic shock absorber 18 are applied between the intermediate mass 140 and the sprung portion 144, so that the expression (4b2) is established.

Where an input vector and an output vector are represented by U and X, respectively, as indicated by expression (4c2) of FIG. 4(c), an equation (4c1) is established. Determinants A, B are represented by expressions (4c3), (4c4), respectively. Elements constituting the input vector U are an absolute displacement $x_1^*$ of the unsprung portion 142, an absolute velocity (differential of the displacement) $dx_1^*/dt$ of the unsprung portion 142 and the output Fm of the electric motor 50, as indicated in expression (4c2). Elements constituting the output vector X are an absolute displacement $x_2'$ of the sprung portion 144, an absolute displacement $x_3'$ of the intermediate mass 140, an absolute velocity $dx_2^*/dt$ of the sprung portion 144 and an absolute velocity $dx_3^*/dt$ of the intermediate mass 140. Each element represented by the output vector X is estimated by an observer, namely, an estimated value of element represented by the output vector X is obtained by the observer. The output Fm of the electric motor 50 is obtained based on an electric current that actually flows through the drive circuit 160. The absolute displacement $x_1^*$ and absolute velocity $dx_1^*/dt$ of the unsprung portion 142 are obtained by integrating a detected value $d^2x_1^*/dt^2$ that is detected by the unsprung-portion acceleration sensor 152.

The expansion/contraction velocity Vs' of the hydraulic shock absorber 18 is obtained based on an estimated value $(dx_3/dt)'$ of the absolute velocity $dx_3/dt$ of the intermediate mass 140.

$$Vs' = (dx_3/dt)' - (dx_1/dt)^* \quad (2)$$

Figure 6:
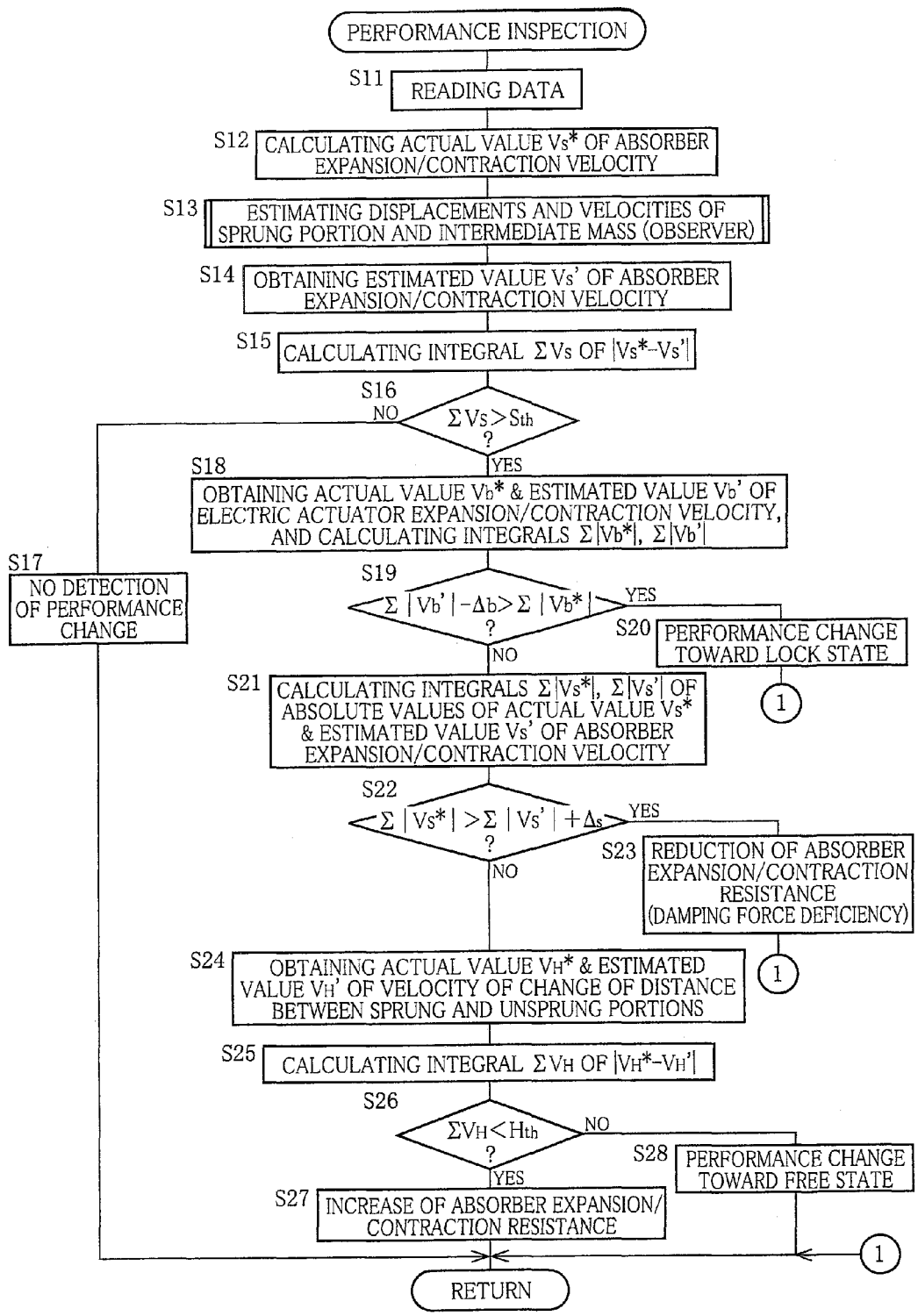
FIG. 6 A flow chart representing a performance inspection program that is stored in the storage portion of the above-described suspension ECU.

The performance inspection program represented by flow chart of FIG. 6 is executed at a predetermined time interval during of running of the vehicle.

In S11, each data (unsprung-portion acceleration, vehicle height, motor rotational angle, etc) is read. In S12, the actual value Vs* of the expansion/contraction velocity (hereinafter referred to as absorber expansion/contraction velocity) of the shock absorber 18 is obtained in accordance with the expression (1). In S13, values such as the estimated value $(dx_3/dt)'$ of the absolute velocity $dx_3/dt$ of the intermediate mass 140 are obtained. In S14, the estimated value Vs' of the absorber expansion/contraction velocity is obtained in accordance with the expression (2). In S15, an integral ΣVs of an absolute value |Vs*−Vs'| of difference between the actual value Vs* and estimated value Vs' is obtained. In S16, it is judged whether or not the integral ΣVs is larger than a threshold value Sth.

$$\Sigma |Vs^* - Vs'| = \Sigma Vs$$

$$Vs > Sth$$

In the present embodiment, the actual value and estimated value of the absorber expansion/contraction velocity are obtained in S12 and S14, respectively, and are discrete values obtained at each cycle time. The integral is a sum of the discrete values (each of which is an absolute value of the data) over a predetermine time period. The integral ΣVs is an example of a value related to an average over the predetermined time period.

When the integral ΣVs is not larger than the threshold value Sth, it is judged in S17 that "the performance is not changed" in the electromagnetic suspension unit 4. When the integral ΣVs is larger than the threshold value Sth, it is judged in S17 that "the performance is changed" in the electromagnetic suspension unit 4. S18 and steps following S18 are implemented to specify in which portion of the electromagnetic suspension unit 4 the performance is changed.

Where an absolute value of the threshold value Sth, which is a positive value larger than 0, is set to be large, it is detected that the performance is changed when a current state of the suspension unit 4 is largely deviated from a state that is dependent on the estimation model 210. On the other hand, where the absolute value of the threshold value Sth is set to be small, it is detected that the performance is changed even when an amount of deviation of the current state from the state that is dependent on the estimation model 210 is small. Where a plurality of values different from each other are employed as threshold values Sth, it is possible to detect a level of the performance change in a plurality of stages.

FIGS. 8-11 show an actual value (solid line) and an estimated value (one-dot chain line) in case of application of the same pattern of vibration from a road surface. As described above, the estimated value is a value estimated based on the estimation model 210, while the actual value is a value obtained by using the simulation model 200 of FIG. 3 (in which the performance of a portion is the same as that in the estimation model 210 when the performance of the portion is not changed, and is made different from that in the estimation model 210 when the performance of the portion is changed).

Figure 8:
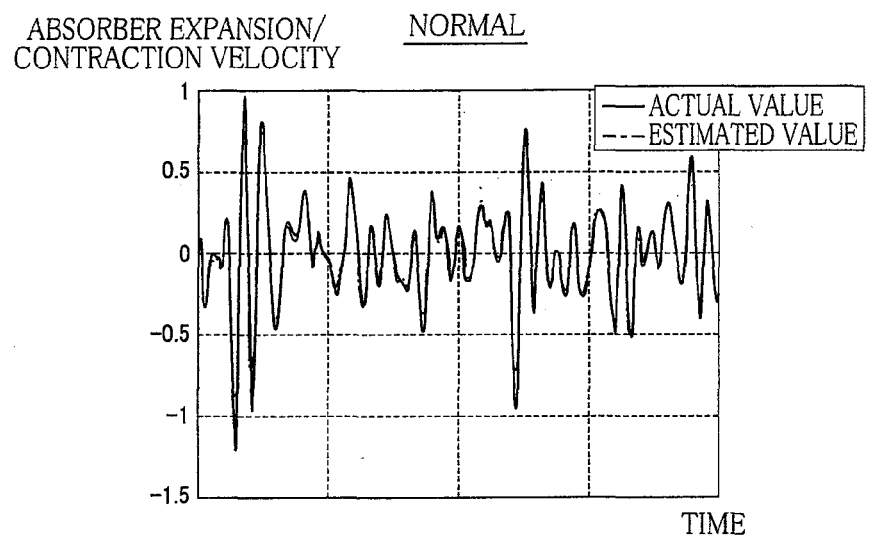
FIG. 8 A view showing result of the performance inspection obtained by using the above-described simulation model.
Figure 9:
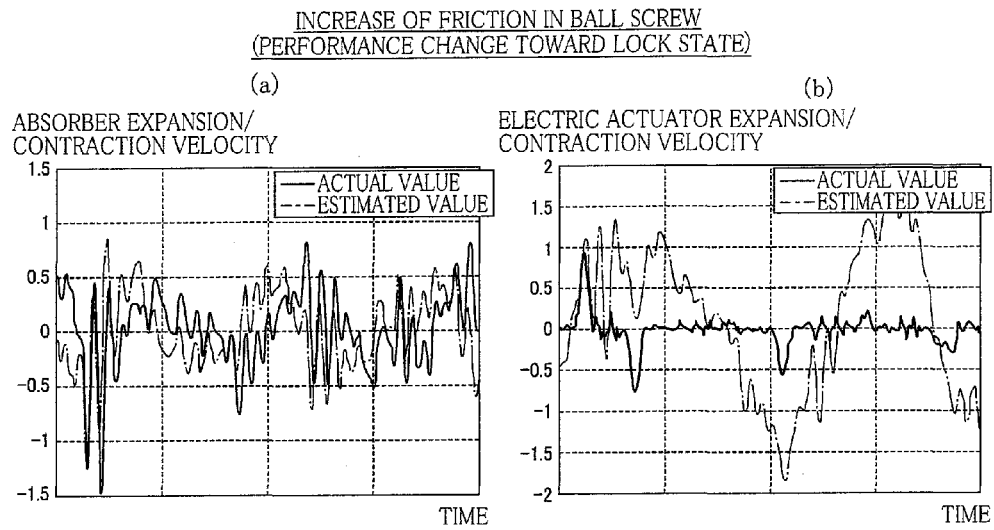
FIG. 9 A set of views showing result of the performance inspection that is carried out in another state other than that of the above-described case.

FIGS. 8, 9(*a*), 10 and 11(*a*), (*c*), (*e*) show the actual value Vs* and estimated value Vs' of the absorber expansion/contraction velocity. FIG. 8 shows the actual value Vs* and estimated value Vs' of the absorber expansion/contraction velocity when the performance of the electromagnetic suspension unit 4 is not changed. As is clear from FIG. 8, the estimated value Vs' and actual value Vs* are well coincident with each other.

FIGS. 9(*a*), 10 and 11(*a*), (*c*), (*e*) show the actual value Vs* and estimated value Vs' of the absorber expansion/contraction velocity when the electromagnetic suspension unit 4 has a portion whose performance is changed. As is clear from any one of FIGS. 9(*a*), 10 and 11(*a*), (*c*), (*e*), the estimated value Vs' and actual value Vs* are not coincident with each other, so that the integral ΣVs of the absolute value of the difference between the estimated value Vs' and actual value Vs* over the predetermined time period is made larger than the threshold value Sth.

In S18, the actual value Vb* of an operation velocity (hereinafter referred to as electric actuator expansion/contraction velocity) of the electric actuator 16 is obtained. The electric actuator expansion/contraction velocity is a velocity Vb of change of a distance between the sprung portion 144 and intermediate mass 140. The actual value Vb* is obtained based on a detected value θ* detected by the rotational angle sensor 162 and a lead L of the screw shaft 54.

$$Vb^* = L \cdot d\theta^*/dt$$

The estimated value Vb' is obtained by subtracting the estimated value $(dx_3/dt)'$ of the absolute velocity of the intermediate mass 140 from the estimated value $(dx_2/dt)'$ of the absolute velocity of the sprung portion 144. The estimated value $(dx_2/dt)'$ of the absolute velocity of the sprung portion 144 and the estimated value $(dx_3/dt)'$ of the absolute velocity of the intermediate mass 140 are obtained by the observer.

$$Vb' = (dx_2/dt)' - (dx_3/dt)'$$

Further, the integral Σ|Vb*| (example of the average expansion/contraction-related-amount actual value, which will be hereinafter referred to as integral of the actual value) of the actual value of the electric actuator expansion/contraction velocity and the integral Σ|Vb'| (example of the average expansion/contraction-related-amount estimated value, which will be hereinafter referred to as integral of the estimated value) of the actual value of the electric actuator expansion/contraction velocity are obtained.

Then, in S19, it is judged whether or not the integral Σ|Vb*| of the actual value is smaller than a lock-tendency-change threshold value SRth (that is obtained by subtracting a predetermined value Δb from the integral Σ|Vb'| of the estimated value).

$$SRth = \Sigma|Vb'| - \Delta b$$

$$\Sigma|Vb^*| < SRth$$

When the integral Σ|Vb*| of the actual value is smaller than the lock-tendency-change threshold value SRth, it is detected in S20 that the performance of the electric actuator 16 is changed such that the electric actuator 16 becomes closer to a lock state, and this fact is informed through the informing portion 168. For example, a state in which friction acting (between the screw shaft 54 and the nut member 52) in the ball screw mechanism 77 is large, a state in which the screw shaft 54 cannot be moved due to bite of the screw shaft 54 and the nut member 52 into each other and a state in which the electric motor 50 is locked correspond to such a change of the performance of the electric actuator 16.

Where the electric motor 50 is controlled in accordance with a predetermined rule, an amount of operation of the electric actuator 16 is increased to a certain degree. Even where the electric motor 50 is not controlled, the friction in the motion converting mechanism 77 is small since the mechanism 77 includes the ball screw mechanism, so that, merely, the damping force is generated depending on the expansion/contraction velocity. Therefore, the expansion/contraction velocity of the electric actuator 16 based on application of vibration from a road surface must be increased to a certain degree.

On the other hand, when the integral Σ|Vb*| of the actual value is smaller than the lock-tendency-change threshold value SRth, it can be detected that resistance in the electric actuator 16 is increased.

FIG. 9(*b*) shows the estimated value Vb' and actual value Vb* of the electric actuator expansion/contraction velocity when the friction between the screw shaft 54 and the nut member 52 is considerably large (when the motion converting mechanism 77 is close to its lock state). As is clear from FIG. 9(*b*), the actual value Vb* is made considerably small as compared to the estimated value Vb'.

Where the lock-tendency-change threshold value SRth is set to a small value, namely, where the predetermined value Δb is set to a large value, it can be detected that the friction is considerably made large due to bite of the screw shaft 54 and the nut member 52 into each other or that the electric motor 50 is locked, when the integral Σ|Vb*| of the actual value is smaller than the lock-tendency-change threshold value SRth. On the other hand, where the lock-tendency-change threshold value SRth is set to a large value, namely, where the predetermined value Δb is set to a small value, it can be detected that the resistance in the electric actuator 16 is made larger than a value in accordance with the estimation model 210, when the integral $\Sigma|Vb^*|$ of the actual value is smaller than the lock-tendency-change threshold value SRth. The predetermined value $\Delta b$ can be set in view of such circumstances. Further, the predetermined value $\Delta b$ can be set in a plurality of steps.

It is noted that the lock-tendency-change threshold value SRth may be also set to a value obtained by multiplying the integral $\Sigma|Vb'|$ of the estimated value by a coefficient that is larger than 0 and smaller than 1.

S21 is implemented to obtain the integral $\Sigma|Vs^*|$ of the absolute value of the actual value Vs* of the absorber expansion/contraction velocity which has been obtained in S12 and also the integral $\Sigma|Vs'|$ of the absolute value of the estimated value Vs' of the absorber expansion/contraction velocity which has been obtained in S14. Then, in S22, it is judged whether or not the integral $\Sigma|Vs^*|$ of the actual value is larger than a expansion/contraction-resistance deficiency threshold value SAth (corresponding to a sum of the integral $\Sigma|Vs'|$ of the estimated value and a predetermined value $\Delta s$).

$$SAth=\Sigma|Vs'|+\Delta s$$

$$\Sigma|Vs^*|>SAth$$

When the integral $\Sigma|Vb^*|$ of the actual value is larger than the expansion/contraction-resistance deficiency threshold value SAth, a positive judgment (YES) is obtained in S22, and S23 is implemented to detect that the performance of the hydraulic shock absorber 18 is changed such that the expansion/contraction resistance is reduced, and to inform this fact. In this case, since the expansion/contraction resistance (sliding resistance) is deficient, the absolute value of the actual value of the expansion/contraction velocity is made larger than the absolute value of the estimated value of the expansion/contraction velocity. For example, a state in which the damping force is deficient due to fluid leakage and oil deterioration, a state in which the friction is made small due to deterioration of a sealing portion between the piston 80 and cylinder body 78 and a state in which spring force of the compression coil springs 84, 86 is deficient correspond to such a change of the performance of the hydraulic shock absorber 18.

Where the resistance acting in the entirety of the shock absorber 18 is referred to as the damping force, the "performance change toward reduction of the expansion/contraction resistance" may be referred also to as "performance change toward deficiency of the damping force".

Figure 10:
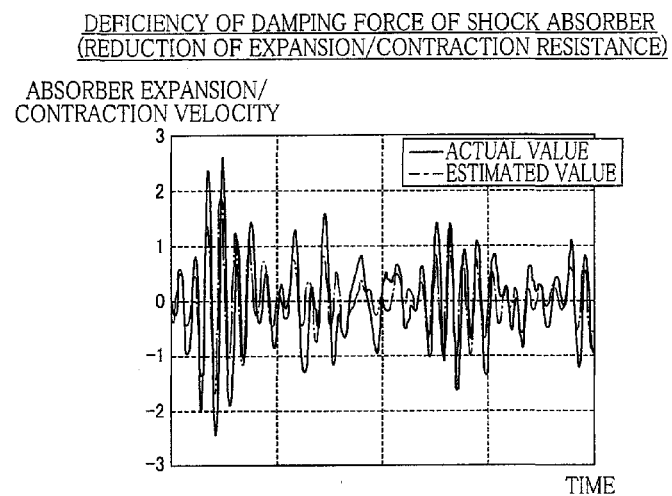
FIG. 10 A view showing result of the performance inspection that is carried out in still another state other than that of the above-described case.

FIG. 10 shows the actual value Vs* and estimated value Vs' of the absorber expansion/contraction velocity of the hydraulic shock absorber 18 in a state in which the expansion/contraction resistance in the shock absorber 18 is deficient. In such a state, the actual value Vs* is larger than the estimated value Vs' as is clear from FIG. 10.

Either when the performance of the electric actuator 16 is changed such that the electric actuator 16 becomes closer to the lock state, or when the performance of the shock absorber 18 is changed such that the expansion/contraction resistance is reduced, the actual value or the like of the absorber-expansion/contraction-related amount is made larger than the estimated value or the like of the absorber-expansion/contraction-related amount. In the present embodiment, when it is judged that the electric actuator 16 is normal (the performance of the electric actuator 16 is not changed toward the lock state) as a result of comparison between the actual value Vb* and estimated value Vb' of the expansion/contraction velocity of the electric actuator 16 in S18 and S19, the control flow goes to S21 and S22. Therefore, when the actual value Vs* or the like is larger than the estimated value Vs' or the like, it can be detected in S22 that the performance of the shock absorber 18 is changed such that the expansion/contraction resistance is reduced.

Where the above-described predetermined value $\Delta s$ is set to a large value whereby the expansion/contraction-resistance deficiency threshold value SAth is set to a large value, it can be detected that the expansion/contraction resistance force of the hydraulic shock absorber 18 is considerably small, when the integral $\Sigma|Vs^*|$ of the actual value is larger than the expansion/contraction-resistance deficiency threshold value SAth. On the other hand, where the predetermined value $\Delta s$ is set to a small value whereby the expansion/contraction-resistance deficiency threshold value SAth is set to a small value, it can be detected that the expansion/contraction resistance force of the hydraulic shock absorber 18 is somewhat deficient, when the integral $\Sigma|Vs^*|$ of the actual value is larger than the expansion/contraction-resistance deficiency threshold value SAth. It is noted that the predetermined value $\Delta s$ may be set to 0.

Further, the expansion/contraction-resistance deficiency threshold value SAth may be also set to a value obtained by multiplying the integral $\Sigma|Vs'|$ of the estimated value by a coefficient $\alpha$ that is not smaller than 1.

In S24, an actual value $V_H^*$ of velocity of change of distance between the sprung and unsprung portions 144, 142 can be obtained as a differential of a detected value H* detected by the vehicle height sensor 154.

$$V_H^*=dH^*/dt$$

Further, an estimated value $V_H'$ of the velocity of the change of the distance between the sprung and unsprung portions 144, 142 can be obtained by subtracting an actual value $(dx_1/dt)^*$ of an absolute velocity of the unsprung portion 142 from an estimated value $(dx_2/dt)'$ of an absolute velocity of sprung portion 144. The actual value $(dx_1/dt)^*$ of the absolute velocity of the unsprung portion 142 can be obtained as an integral of a detected value that is detected by the unsprung-portion acceleration sensor 152.

$$V_H'=(dx_2/dt)'-(dx_1/dt)^*$$

Then, in S25, an integral $\Sigma V_H$ of an absolute value $|V_H^*-V_H'|$ of difference between the estimated value $V_H'$ and the actual value $V_H^*$. In S26, it is judged whether or not the integral $\Sigma V_H$ is smaller than a particular threshold value Hth.

$$\Sigma V_H=\Sigma|V_H^*-V_H'|$$

$$\Sigma V_H<Hth$$

When the integral $\Sigma V_H$ is smaller than the particular threshold value Hth, it is judged in S27 that the performance of the hydraulic shock absorber 18 is changed such that the expansion/contraction resistance is increased. When the integral $\Sigma V_H$ is not smaller than the particular threshold value Hth, it is judged in S28 that the performance of the electric actuator 16 is changed such that the electric actuator 16 becomes closer to the free state. In either case, it is informed that the performance is changed and which portion of the electromagnetic suspension unit 4 is changed in its performance.

S24 is implemented when a negative judgment (NO) is obtained in S22. Therefore, S24 through S26 are implemented when the actual value or the like of the absorber-expansion/contraction-related amount is smaller than the estimated value or the like of the absorber-expansion/contraction-related amount. The actual value or the like of the absorber-expansion/contraction-related amount is made smaller than the estimated value or the like of the absorber-expansion/contraction-related amount when the performance of the electric actuator 16 is changed such that the actuator 16 becomes closer to the free state and when the performance of the shock absorber 18 is changed such that resistance in the absorber 18 is increased.

The present electromagnetic suspension unit 4 is designed such that the expansion/contraction of the shock absorber 18 is smaller than the expansion/contraction of the electric actuator 16. Therefore, when the difference between the actual value or the like and the estimated value or the like of the sprung/unsprung-portions-distance-related amount is small, it can be considered that the performance change of the suspension unit 4 is caused by the shock absorber 18. When the difference is large, it can be considered that the performance change of the suspension unit 4 is caused by the electric actuator 16.

Therefore, when the difference between the actual value or the like and the estimated value or the like of the sprung/unsprung-portions-distance-related amount is small, it is judged that the resistance in the shock absorber 18 is increased. When the difference is large, it is judged that the performance of the electric actuator 16 is changed such that the actuator 16 becomes closer to the free state.

Figure 11:
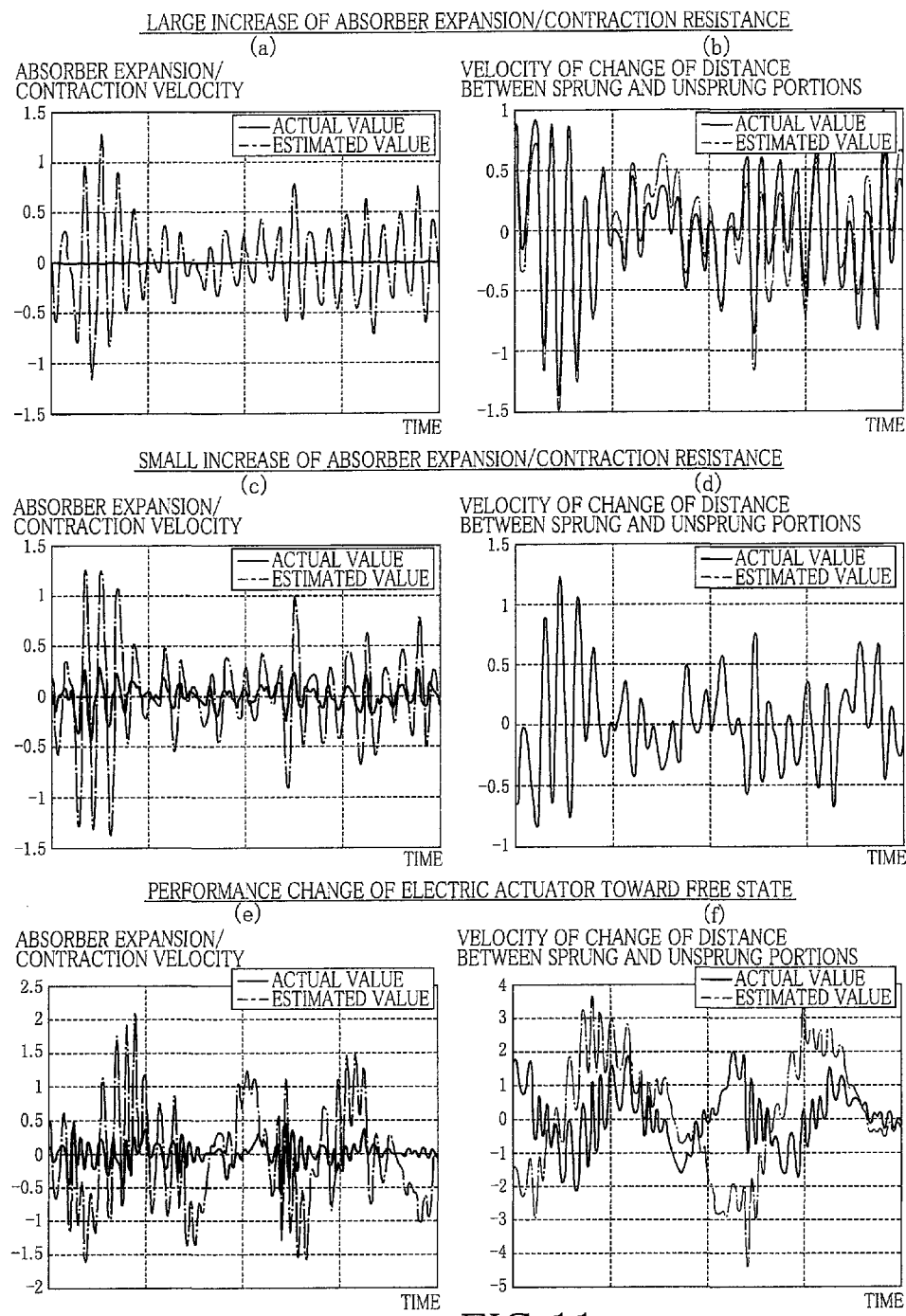
FIG. 11 A set of views showing result of the performance inspection that is carried out in still another state other than that of the above-described case.

FIG. 11(*b*) shows the estimated value $V_H{'}$ and actual value $V_H{*}$ of the velocity of the change of the distance between the sprung and unsprung portions 144, 142 when the hydraulic shock absorber 18 is locked, namely, when the actual value Vs* of the absorber expansion/contraction velocity becomes substantially zero (see FIG. 11(*a*)). The hydraulic shock absorber 18 is locked, for example, when valves provided in the piston 80 and base valve body 116 of a damping-force generating mechanism are stuck closed, when all communication passages of the damping-force generating mechanism are closed due to entrance of foreign matters into the passages or when the piston 80 cannot be moved by the foreign matters. FIG. 11(*d*) shows the estimated value $V_H{'}$ and actual value $V_H{*}$ of the velocity of the change of the distance between the sprung and unsprung portions 144, 142 when the expansion/contraction resistance in the hydraulic shock absorber 18 is slightly larger than a value in accordance with the estimation model 210 (see FIG. 11(*c*)). In either of the case of the considerable increase of the absorber expansion/contraction resistance and the slight increase of the absorber expansion/contraction resistance, the difference between the estimated value $V_H{'}$ and actual value $V_H{*}$ is small as is clear from FIGS. 11(*b*), (*d*).

Further, FIG. 11(*f*) shows the estimated value $V_H{'}$ and actual value $V_H{*}$ of the velocity of the change of the distance between the sprung and unsprung portions 144, 142 when the electric motor 50 is placed in the free state. The difference between the estimated value $V_H{'}$ and actual value $V_H{*}$ in case of FIG. 11(*f*) is obviously larger than the difference in case of FIG. 11(*b*) and the difference in case of FIG. 11(*d*).

The particular threshold value Hth is set to a value that enables distinction therebetween, and may be, for example, a value that is larger than the integral $\Sigma|V_H{*}-V_H{'}|$ (in case shown in FIG. 11(*b*)) by a predetermined value.

As described above, in the present embodiment, the performance change of the electric actuator 16 and the performance change of the shock absorber 18 are distinguished from each other. Further, since a portion of the electromagnetic suspension unit 4 suffering from the performance change is specified and then the specified portion is informed, there is an advantage that it is not necessary to replace an entirety of the electromagnetic suspension unit 4.

In the present embodiment, the sprung-portion acceleration sensor 150, unsprung-portion acceleration sensor 152, vehicle height sensor 154 and rotational angle sensor 162 cooperate with portions of the suspension ECU 156 which are assigned to store and execute the performance inspection program represented by the flow chart of FIG. 6, to constitute a performance-change detecting device. A portion of the performance-change detecting device, which is provided by the vehicle height sensor 154, rotational angle sensor 162 and portions of the suspension ECU 156 assigned to store and implement S12, constitutes an actual absorber-expansion/contraction-related amount obtaining portion. A portion of the performance-change detecting device, which is provided by the unsprung-portion acceleration sensor 152, ammeter 164 and portions of the suspension ECU 156 assigned to store and implement S13 and S14, constitutes an absorber-expansion/contraction-related amount estimating portion. A portion of the performance-change detecting device, which is provided by portions of the suspension ECU 156 assigned to store and implement S15 through S18, S22 and S23, constitutes a comparison-based performance-change detecting portion. A portion of the comparison-based performance-change detecting portion, which is provided by portions of the suspension ECU 156 assigned to store and implement S15 through S17, constitutes a performance-change-presence detecting portion. A portion of the comparison-based performance-change detecting portion, which is provided by portions of the suspension ECU 156 assigned to store and implement S22 and S23, constitutes a expansion/contraction-resistance deficiency detecting portion. The actual absorber-expansion/contraction-related amount obtaining portion serves also as an actual expansion/contraction-related-amount calculating portion. The absorber-expansion/contraction-related amount estimating portion serves also as an observer-based expansion/contraction-related amount estimating portion. Further, a portion of the performance-change detecting device, which is provided by portions of the suspension ECU 156 assigned to store and implement S18 through S20 and S25 through S28, constitutes a performance-changed-portion specifying portion. A portion of the performance-changed-portion specifying portion, which is provided by portions of the suspension ECU 156 assigned to store and implement S19 and S20, constitutes a lock-tendency-change detecting portion.

Figure 7:
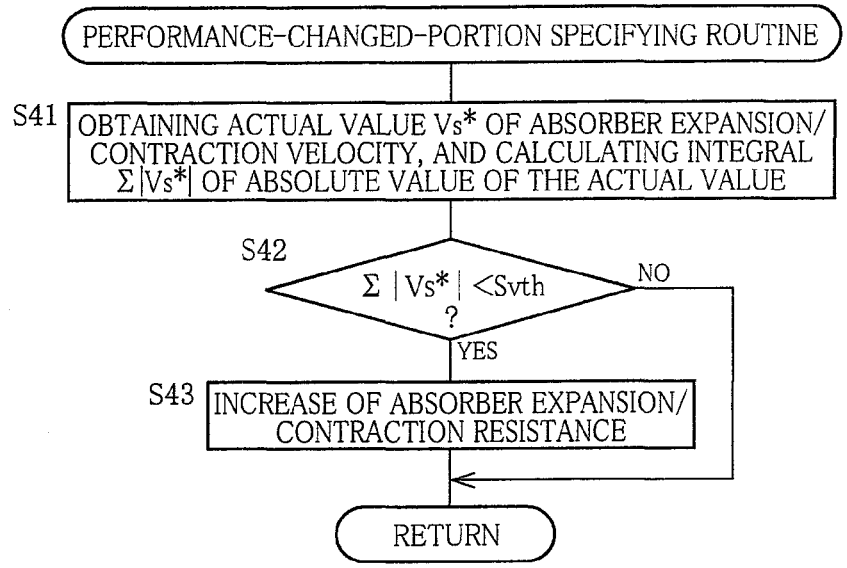
FIG. 7 A flow chart representing a flow chart representing a part of the above-described performance inspection program.

On the other hand, when it is judged in S28 that the performance of the electric actuator 16 is changed such that the actuator 16 becomes closer to the free state, there is a possibility that the performance of the hydraulic shock absorber 18 is also changed such that the expansion/contraction resistance is increased. This is because a large difference between the actual value $V_H{*}$ and estimated value $V_H{'}$ of the velocity of the change of the distance between the sprung and unsprung portions 144, 142 could be caused not only the performance change of the electric actuator 16 toward the free state but also the performance change of the shock absorber 18 toward increase of the expansion/contraction resistance. In this sense, after implementation of S28, it is possible to detect whether or not the performance of the hydraulic shock absorber 18 is changed such that the expansion/contraction resistance is increased. To this end, a performance-changed-portion specifying routine represented by flow chart of FIG. 7 may be executed.

In S41, the actual value Vs* of the expansion/contraction velocity of the shock absorber 18 upon application of vibration of a high frequency is obtained, and the integral $\Sigma|Vb{*}|$ of the absolute value of the actual value Vs* over a predetermined time period is obtained. For example, a high frequency component may be extracted from the actual value Vs* that has been obtained in S12, so that the integral $\Sigma|Vb{*}|$ can be obtained from the extracted high frequency component of the actual value Vs*. Then, in S42, it is judged whether or not the integral Σ|Vb*| is smaller than a predetermined resistance-increase threshold value SVth.

$$\Sigma|Vs^*|<SVth$$

When the integral Σ|Vb*| is smaller than the predetermined resistance-increase threshold value SVth, a positive judgment (YES) is obtained in S42, and it is judged that the performance of the hydraulic shock absorber 18 is changed such that the expansion/contraction resistance is made large.

It is noted that S41 through S43 may be implemented in a state in which vibration of a high frequency is being applied to the electromagnetic suspension unit 4 from an external device such as vibrating device. In this case, it is possible to cause the suspension unit 4 to be vibrated at a desired frequency.

It is also noted that, in the above-described embodiment, S41 through S43 may be implemented when the integral Σ|Vs'| of the absolute value of the estimated value Vs' of the absorber expansion/contraction velocity is not smaller than a predetermined value (that is larger than 0). There is a case in which the actual value Vs* of the expansion/contraction velocity does not include a high frequency component. This arrangement is effective, in such a case, to prevent a positive judgment (YES) from being obtained in S42 and accordingly prevent judgment that the expansion/contraction resistance is large.

Further, in the above-described embodiment, the integrals of the absolute values of the actual and estimated values Vb* and Vb' of the electric actuator expansion/contraction velocity are obtained in S18 and the obtained integrals are compared to each other in S19. However, S18 may be implemented to obtain the integral Σ|Vb*| of the actual value Vb* of the electric actuator expansion/contraction velocity over a predetermined time period, and S19 may be implemented to judge to whether or not the integral Σ|Vb*| is smaller than a lock-tendency-change threshold value Sbtha that is a predetermined fixed value.

$$\Sigma|Vs^*|<Sbtha$$

The lock-tendency-change threshold value Sbth used in S19 of the flow chart of FIG. 6 may be referred to as a relative lock-tendency-change threshold value, while the lock-tendency-change threshold value Sbtha of the present embodiment may be referred to as an absolute lock-tendency-change threshold value.

Further, the performance change of the electromagnetic suspension unit 4 may be detected by comparing an actual value and an estimated value of an intermediate-member-movement-related amount that is at least one of displacement and absolute velocity of the intermediate mass 140. For example, estimated values $x_3'$, $(dx_3/dt)'$ of the displacement $x_3$ and absolute velocity $dx_3/dt$ of the intermediate mass 140 are estimated in accordance with the estimation model 210, by the observer.

On the other hand, an actual value $x_3^*$ of the displacement $x_3$ of the intermediate mass 140 and an actual value $(dx_3/dt)^*$ of the absolute velocity $dx_3/dt$ of the intermediate mass 140 are obtained based on an actual value $(H^*-L\cdot\theta^*)$ of the absorber length, an actual value $Vs^*\{=(dH/dt)^*-(L\cdot d\theta/dt)^*\}$ of the absorber expansion/contraction velocity, an actual value $x_1^*$ of the displacement of the unsprung portion 142 and an actual value $(dx_1/dt)^*$ of the absolute velocity of the unsprung portion 142.

$$x_3^*=(H^*-L\cdot\theta^*)+x_1^* \quad (3)$$

$$(dx_3/dt)^*=(dH/dt)^*-L\cdot(d\theta/dt)^*+(dx_1/dt)^*=Vs^*+(dx_1/dt)^* \quad (4)$$

When the absolute value of the difference between the actual value or the like and the estimated value or the like of the intermediate-member-movement-related amount is large, the performance change of the electromagnetic suspension unit 4 is detected.

Figure 12:
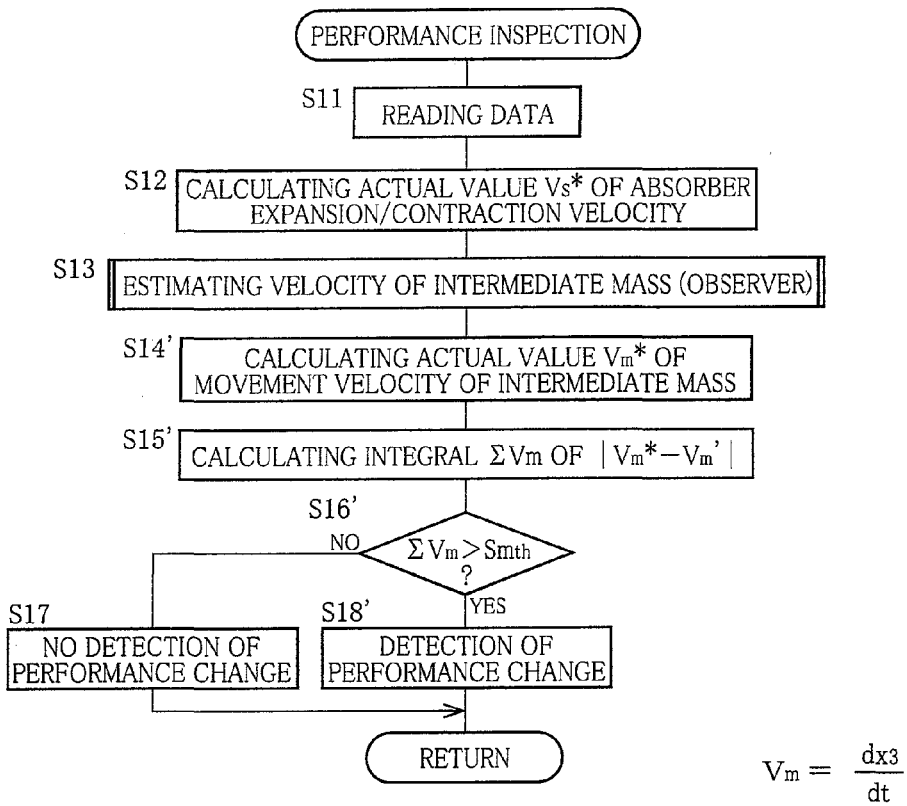
FIG. 12 A flow chart showing a part of another program that is other than the above-described performance inspection program.

An example of the detection of the performance change by comparison of the actual and estimated values of the intermediate-member-movement-related amount will be described with reference to flow chart of FIG. 12 that represents a performance inspection program. In the present embodiment, the actual and estimated values of the absolute velocity of the intermediate mass 140 are compared to each other. In the flow chart of FIG. 12, the absolute velocity $(dx_3/dt)$ of the intermediate mass 140 will be represented by Vm.

In S11 through S13, the actual value Vs* of the absorber expansion/contraction velocity is detected as in the above-described embodiment, and an estimated value Vm' $\{(dx_3/dt)'\}$ of the absolute velocity of the intermediate mass 140 is obtained. In S14', an actual value Vm*$\{(dx3/dt)^*\}$ of the absolute velocity of the intermediate mass 140 is calculated in accordance with the above expression (4). In S15', an integral Σ|Vm'−Vm*|(=Σ|(dx3/dt)'−(dx3/dt)*|) of an absolute value of a difference between the estimated value Vm' and actual value Vm* is obtained. In S16', the integral Σ|Vm'−Vm*| is compared to the intermediate-member-movement-based threshold value Smth, so that it is detected whether the performance change is present or absent.

$$\Sigma|Vm'-Vm^*|>Smth$$

When the integral Σ|Vm'−Vm*| is not larger than the intermediate-member-movement-based threshold value Smth, it is judged that the performance of the electromagnetic suspension unit 4 is not changed. When the integral Σ|Vm'−Vm*| is larger than the intermediate-member-movement-based threshold value Smth, it is judged that the performance of the electromagnetic suspension unit 4 is changed. By implementation of S18' and steps following S18', it is possible to specify a portion of the electromagnetic suspension unit 4 whose performance is changed.

In the present embodiment, the unsprung-portion acceleration sensor 152 and ammeter 162 cooperate with portions of the suspension ECU 156, which are assigned to store and implement S13, to constitute an intermediate-member-movement-related-amount estimating portion. The unsprung-portion acceleration sensor 152 and ammeter 162 cooperate with portions of the suspension ECU 156, which are assigned to store and implement S14', to constitute an intermediate-member-movement-related-amount obtaining portion. The unsprung-portion acceleration sensor 152 and ammeter 162 cooperate with portions of the suspension ECU 156, which are assigned to store and implement S16', to constitute an intermediate-member-movement-based performance-change detecting portion.

In the above-described embodiment, the actual value Vs* and estimated value Vs' of the absorber expansion/contraction velocity are compared to each other. However, an actual value Ls* and an estimated value Ls' of the expansion/contraction amount of the hydraulic shock absorber 18 or an actual value Ls* and an estimated value Ls' of a length (distance between the bottom surface of the transmitting member 82 and a contact position in which the absorber housing 30 and the mount portion 98) of the shock absorber 18 may be compared to each other.

Similarly, the comparison between the actual value $V_H^*$ and estimated value $V_H'$ of the velocity $V_H$ of the change of the distance between the sprung and unsprung portions 144, 142 may be replaced by comparison between the actual value H* and estimated value H' of the change of the distance between the sprung and unsprung portions 144, 142. The comparison between the actual value Vb* and estimated value Vb' of the electric actuator expansion/contraction velocity may be replaced by comparison between the actual value Lb* and estimated value Lb' of the expansion/contraction amount or length (distance between the bottom surface of the transmitting member 82 and the body-side portion 14 in the present embodiment).

Further, the judgment as to whether or not the performance is changed may be made when the same judgment result is obtained consecutively a plurality of times.

Further, the judgment may be made with provision of hysteresis. That is, even when the performance change is detected, it can be judged that it is not the performance change in case of satisfaction of another condition (which is close to a normal condition such as a lower threshold value) that is different from a performance-change judging condition. Owing to the provision of hysteresis, it is possible to avoid frequent change of the result in the judgment as to whether or not the performance is changed (namely, avoid hunting in the judgment result).

Further, it is possible to employ an arrangement that enables detection of a degree of the performance change.

Figure 13:
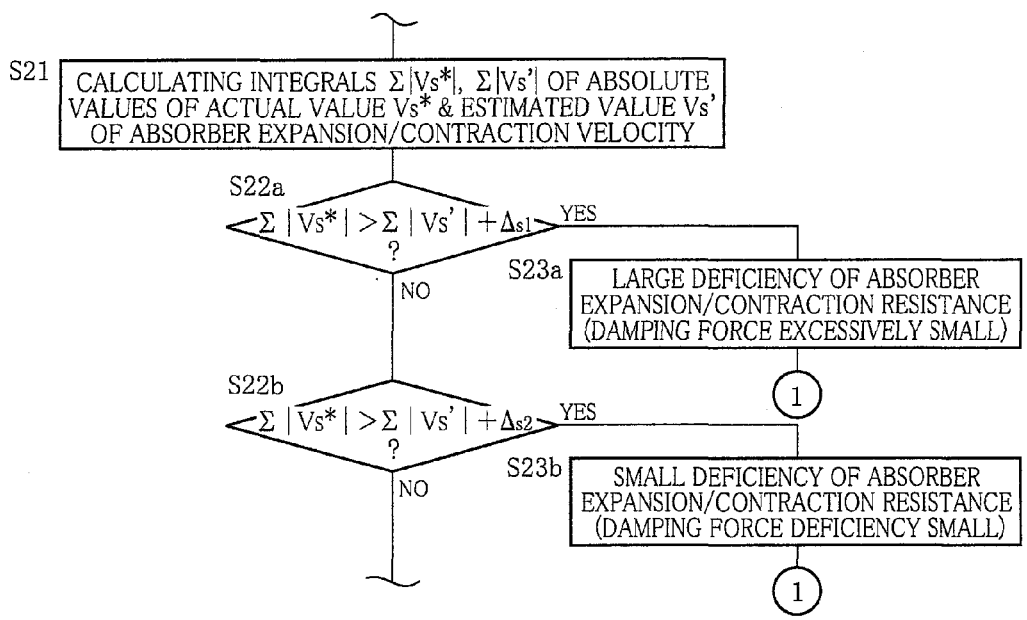
FIG. 13 A flow chart showing a part of still another program that is other than the above-described performance inspection program.

An example of such an arrangement is shown in FIG. 13. Flow chart of FIG. 13 represents a part of the performance inspection program. S11 through S21 and S24 through S28 are implemented in the same manner as in the above-described embodiment.

In the present embodiment with the arrangement shown in FIG. 13, the predetermined value Δs is set to two values different from each other and the expansion/contraction-resistance deficiency threshold value SAth is set to two values different from each other in the judgment as to whether or not the integral Σ|Vb*| of the actual value Vs* of the absorber expansion/contraction velocity is larger than the expansion/contraction-resistance deficiency threshold value SAth {Σ|Vs'|+Δs}.

First expansion/contraction-resistance deficiency threshold value SAth1=Σ|Vs'|+Δs1

Second expansion/contraction-resistance deficiency threshold value SAth2=Σ|Vs'|+Δs2

$$\Delta s1 > \Delta s2$$

In S22*a*, it is judged whether or not the integral Σ|Vb*| of the actual value Vs* of the absorber expansion/contraction velocity is larger than the first expansion/contraction-resistance deficiency threshold value SAth1 (Σ|Vs'|+Δs1). In S22*b*, it is judged whether or not the integral Σ|Vb*| of the actual value Vs* of the absorber expansion/contraction velocity is larger than the second expansion/contraction-resistance deficiency threshold value SAth2 (Σ|Vs'|+Δs2). When the integral Σ|Vb*| is larger than the first expansion/contraction-resistance deficiency threshold value SAth1, it is judged in S23*a* that a degree of deficiency of the expansion/contraction resistance in the shock absorber 18 is large (namely, the expansion/contraction resistance is considerably small). When the integral Σ|Vb*| is larger than the second expansion/contraction-resistance deficiency threshold value SAth2, it is judged in S23*b* that the degree of deficiency of the expansion/contraction resistance in the shock absorber 18 is small. The result of the judgment is informed.

Thus, the degree of the performance change is detected in a plurality of stages, and the result of the detection is informed to a vehicle driver, so that the vehicle driver can know details of state of change of the performance of the electromagnetic suspension unit 4.

Further, where the present embodiment is applied in a stage of assessment of the performance change of the electromagnetic suspension unit 4, the state of the performance change can be obtained in details.

In the present embodiment, portions of the suspension ECU 156, which are assigned to store and implement S22*a*, S22*b*, S23*a*, S23*b*, constitute a performance-change-level detecting portion.

Further, in the above-described embodiment, the performance change is detected by comparing the actual value Vs* and estimated value Vs' of the absorber expansion/contraction velocity. However, the performance change may be detected by comparing the actual values Vs* of the expansion/contraction velocities of the shock absorbers 18 that are provided for respective four wheels.

Figure 14:
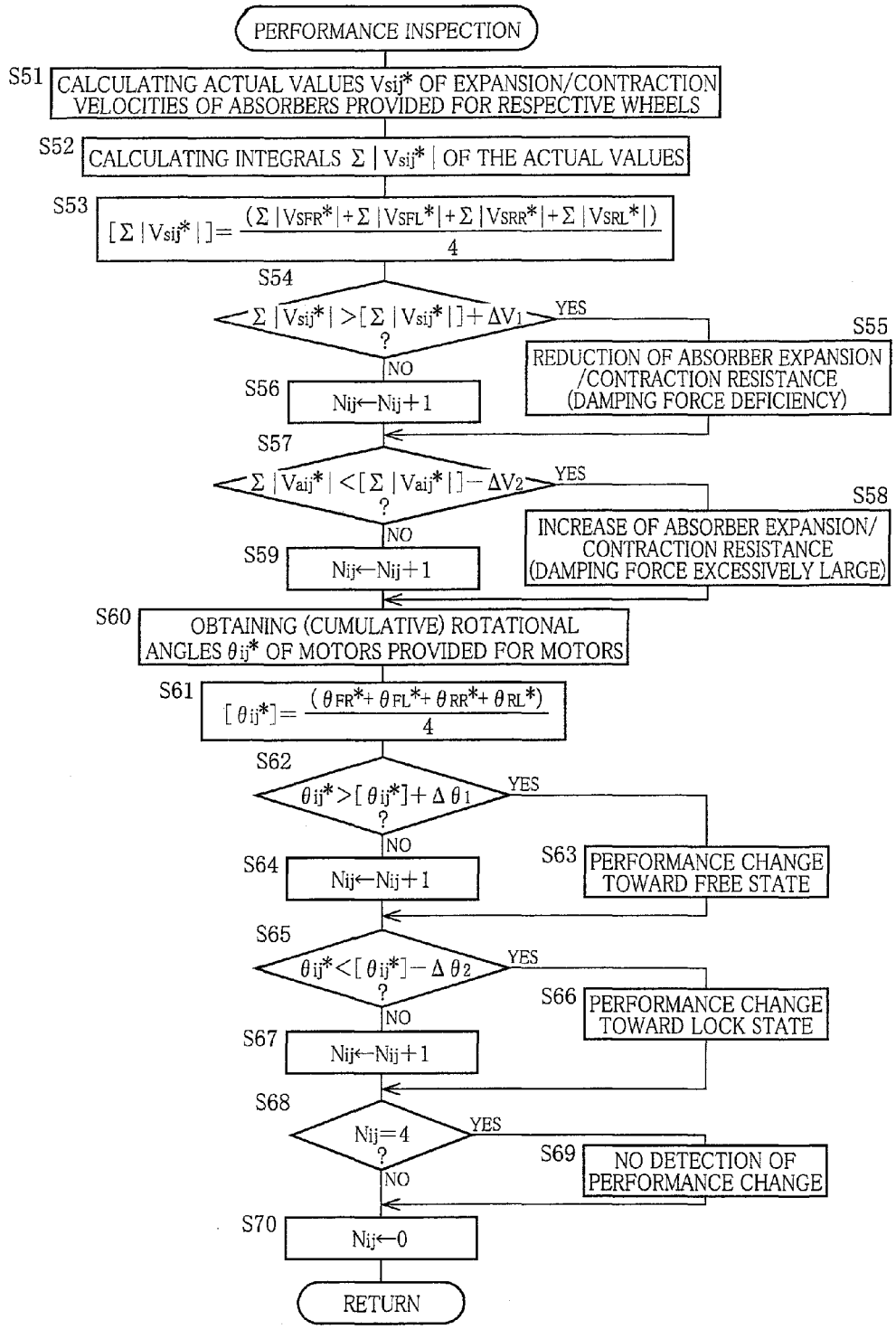
FIG. 14 A flow chart showing another performance inspection program that is stored in the storage portion of the above-described suspension ECU.

An example of a performance inspection program used in such an arrangement is shown in FIG. 14. The present performance inspection program is also executed during running of the vehicle. In the present embodiment, in addition to the actual values Vs* of the expansion/contraction velocities of the shock absorbers 18 provided for the respective four wheels, actual values θ* of the rotational angles of the electric motors 50 provided for the respective four wheels are compared to each other, so that the performance change is detected based on the comparison of the actual values Vs* of the expansion/contraction velocities of the shock absorbers 18 and the comparison of the actual values θ* of the rotational angles of the electric motors 50.

In S51 through S59, the performance change of each of the hydraulic shock absorbers 18 is detected by comparing the actual values Vs* of the expansion/contraction velocities of the shock absorbers 18 provided for the front right, front left, rear right and rear left wheels.

S51 is implemented to obtain the actual values Vsij* of the expansion/contraction velocities of the shock absorbers 18 of the electromagnetic suspension units 4FL, 4FR, 4RL, 4RR (hereinafter, a position of the wheel will be generally represented by ij, wherein i=F, R, j=R, L) provided for the front right, front left, rear right and rear left wheels. S52 is implemented to obtain the integrals Σ|Vsij*| of the absolute values of the actual values Vsij*. S53 is implemented to obtain an average [Σ|Vsij*|] of the integrals Σ|Vsij*| that have been obtained for the respective electromagnetic suspension units 4 provided for the front right, front left, rear right and rear left wheels.

Then, in S54, the integrals Σ|Vsij*| of the absolute values of the actual values Vsij* with respect to the electromagnetic suspension units 4*ij* provided for assessed ones of the front right, front left, rear right and rear left wheels are sequentially subjected to a judgment as to whether or not each of the integrals Σ|Vsij*| is larger than the average [Σ|Vsij*|] by a predetermined value ΔV1 or more.

When the integral Σ|Vsij*| with respect to the assessed wheel is larger than the average [Σ|Vsij*|] by the predetermined value ΔV1 or more, it is judged in S55 that the damping force is deficient. When the integral Σ|Vsij*| with respect to the assessed wheel is not larger than the average [Σ|Vsij*|] by the predetermined value ΔV1 or more, a no-performance-change judgment counter Nij is increased by 1 in S56.

In S57, the integrals Σ|Vsij*| of the absolute values of the actual values Vsij* with respect to the electromagnetic suspension units 4*ij* provided for the assessed wheels are sequentially subjected to a judgment as to whether or not each of the integrals Σ|Vsij*| is smaller than the average [Σ|Vsij*|] by a predetermined value ΔV2 or more. When the integral Σ|Vsij*| with respect to the assessed wheel is smaller than the average [Σ|Vsij*|] by the predetermined value ΔV2 or more, it is judged in S58 that the damping force is large. When the integral $\Sigma |Vsij^*|$ with respect to the assessed wheel is not smaller than the average $[\Sigma |Vsij^*|]$ by the predetermined value $\Delta V2$ or more, the no-performance-change judgment counter Nij is increased by 1 in S59.

The positive judgment (YES) cannot be obtained both in S54 and S57. Therefore, when the performance change of the hydraulic shock absorber 18ij is detected, the negative judgment (NO) is obtained in S54 or S57, so that a value of the no-performance-change judgment counter Nij becomes 1. When the performance change of the hydraulic shock absorber 18ij is not detected, the value of the no-performance-change judgment counter Nij becomes 2.

In S60, a cumulative rotational angle $\theta ij^*$ of each of the electric motors 50 (provided for the respective wheels) over a predetermined time period is detected. In S61, an average $[\theta ij^*]$ of the cumulative rotational angles $\theta ij^*$ with respect to the front right, front left, rear right and rear left electromagnetic suspension units 4 is obtained. In S62, the cumulative rotational angles $\theta ij^*$ with respect to the assessed wheels are sequentially subjected to a judgment as to whether or not each of the cumulative rotational angle $\theta ij^*$ is larger than the average $[\theta ij^*]$ by a predetermined value $\Delta \theta 1$ or more. When the cumulative rotational angle $\theta ij^*$ is larger than the average $[\theta ij^*]$ by the predetermined value $\Delta \theta 1$ or more, it is judged in S63 that the performance of the electric motor 50 is changed such that the electric motor 50 becomes closer to the free state. When the cumulative rotational angle $\theta ij^*$ is not larger than the average $[\theta ij^*]$ by the predetermined value $\Delta \theta 1$ or more, the no-performance-change judgment counter Nij is increased by 1 in S64.

Next, in S65, the cumulative rotational angles $\theta ij^*$ with respect to the assessed wheels are sequentially subjected to a judgment as to whether or not each of the cumulative rotational angle $\theta ij^*$ is smaller than the average $[\theta ij^*]$ by a predetermined value $\Delta \theta 2$ or more. When the cumulative rotational angle $\theta ij^*$ is smaller than the average $[\theta ij^*]$ by the predetermined value $\Delta \theta 2$ or more, it is judged in S66 that the performance of the electric motor 50 is changed such that the electric motor 50 becomes closer to the lock state. When the cumulative rotational angle $\theta ij^*$ is not smaller than the average $[\theta ij^*]$ by the predetermined value $\Delta \theta 2$ or more, the no-performance-change judgment counter Nij is increased by 1 in S67.

In S68, it is judged whether the value of the no-performance-change judgment counter Nij is four or not. When the value of the no-performance-change judgment counter Nij is four, it is considered that neither the shock absorber 18 nor the electric motor 50 suffers from the performance change (S69). Then, in S70, the value of the no-performance-change judgment counter is reset to 0.

It is noted that each of the above-described predetermined values $\Delta V1$, $\Delta V2$, $\Delta \theta 1$, $\Delta \theta 2$ may be either a predetermined fixed value or a value dependent on a corresponding one of the averages $[\Sigma |Vsij^*|]$, $[\theta ij^*]$. A predetermined range of the absorber-expansion/contraction-related amount is determined depending on the average $[\Sigma |Vsij^*|]$ and predetermined values $\Delta V1$, $\Delta V2$. A predetermined range of number of rotation of the motor 50 is determined depending on the average $[\theta ij^*]$ and predetermined values $\Delta \theta 1$, $\Delta \theta 2$.

Thus, by comparing actual movements of portions of the respective electromagnetic suspension units 4FR, 4FL, 4RR, 4RL provided for the respective wheels 2FR, 2FL, 2RR, 2RL, it is possible to detect the performance change and to specify a performance changed portion of the electromagnetic suspension unit. In the present embodiment, the vehicle height sensors 154 and rotational angle sensors 162 cooperate with portions of the suspension ECU 156 which are assigned to store and implement S51 through S59, to constitute a wheels-comparison-based performance-change detecting portion. A portion of the wheels-comparison-based performance-change detecting portion, which is provided by the rotational angle sensors 162 and portions of the suspension ECU 156 assigned to store and implement S60 through S67, constitutes a wheels-comparison-based electric-actuator-performance-change detecting portion. A portion of the wheels-comparison-based electric-actuator-performance-change detecting portion, which is provided by the rotational angle sensors 162 and portions of the suspension ECU 156 assigned to store and implement S60, constitutes an electric-operation-related-amount obtaining portion.

Figure 15:
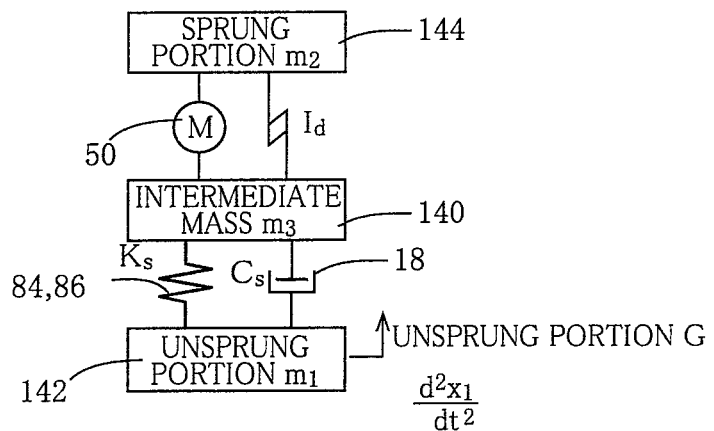
FIG. 15 A view showing another estimation model that is other than the above-described estimation model.

Although the estimation model 210 is used in the above-described embodiment, it is possible to use an estimation model 280 as shown in FIG. 15. The estimation model 280 is different from the estimation model 210 in that the suspension spring 20 is not provided in the model 280.

Figure 16:
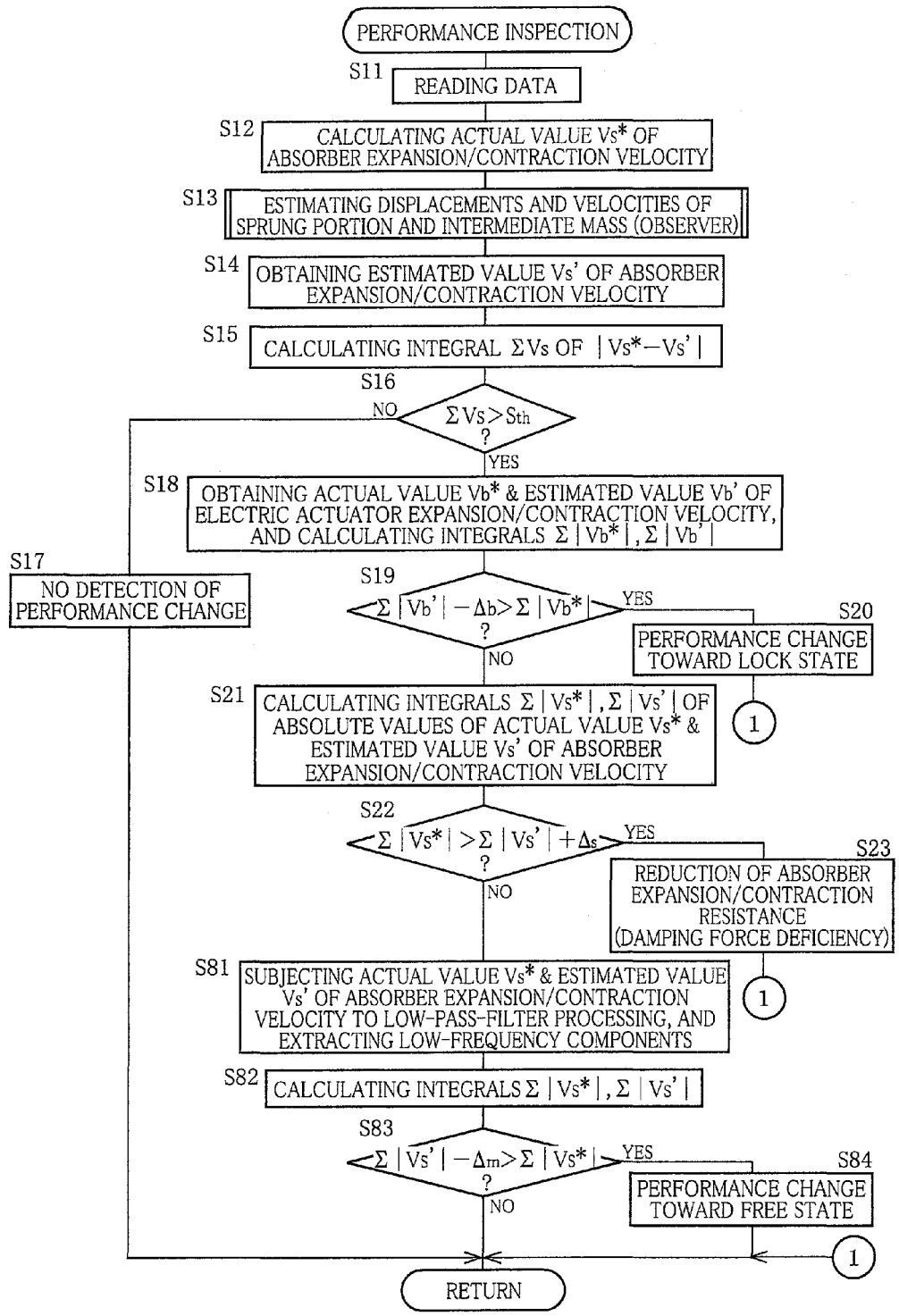
FIG. 16 A flow chart representing a performance inspection program that is carried out by using the above-described estimation model.

In the present embodiment, a performance inspection program represented by flow chart of FIG. 16 is executed. The present performance inspection program is substantially the same as the program executed in the above-described embodiment, but is different from the program executed in the above-described embodiment, with respect to implementations of S24 through S28. Since the suspension spring 20 is not taken into consideration in the estimation model 280, it is preferable to detect the performance change, by comparing the estimated value Vs' and actual value Vs* of the absorber expansion/contraction velocity upon application of vibration of a low frequency, or by comparing low-frequency components of the estimated value Vs' and actual value Vs* of the absorber expansion/contraction velocity, rather than based on the velocity $V_H$ of the change of the distance between the sprung and unsprung portions 144, 142.

In this sense, the actual value Vs* and estimated value Vs' of the absorber expansion/contraction velocity are subjected to low-pass filter processing in S81. Then, in S82, integrals $\Sigma |Vs^*|$, $\Sigma |Vs'|$ of the absolute values of the actual and estimated values are obtained based on the values subjected to the processing in S81. Then, S83 is implemented to judge whether or not the integral $\Sigma |Vs^*|$ is smaller than the particular threshold value Hsth (value obtained by subtracting a predetermined value Am from the integral $\Sigma |Vs'|$).

$$Hsth = \Sigma |Vs'| - \Delta m$$

$$Hsth > \Sigma |Vs^*|$$

When the integral $\Sigma |Vs^*|$ is smaller than the particular threshold value Hsth, the control flow goes to S84 in which it is judged that the performance of the electric actuator 16 is changed such that the actuator 16 becomes closer to its free state.

Thus, the simplified model can be used, so that it is possible to facilitate calculation required for the estimation.

In above-described embodiment, there has been described the electromagnetic suspension unit 4 in which the shock absorber 18 and the electric actuator 16 are disposed in series to each other, between the sprung portion 144 and unsprung portion 142. However, the invention is equally applicable to an electromagnetic suspension unit in which an electric actuator and a shock absorber are disposed in parallel with each other. An example of this parallel arrangement is shown in FIGS. 17 and 18.

Figure 17:
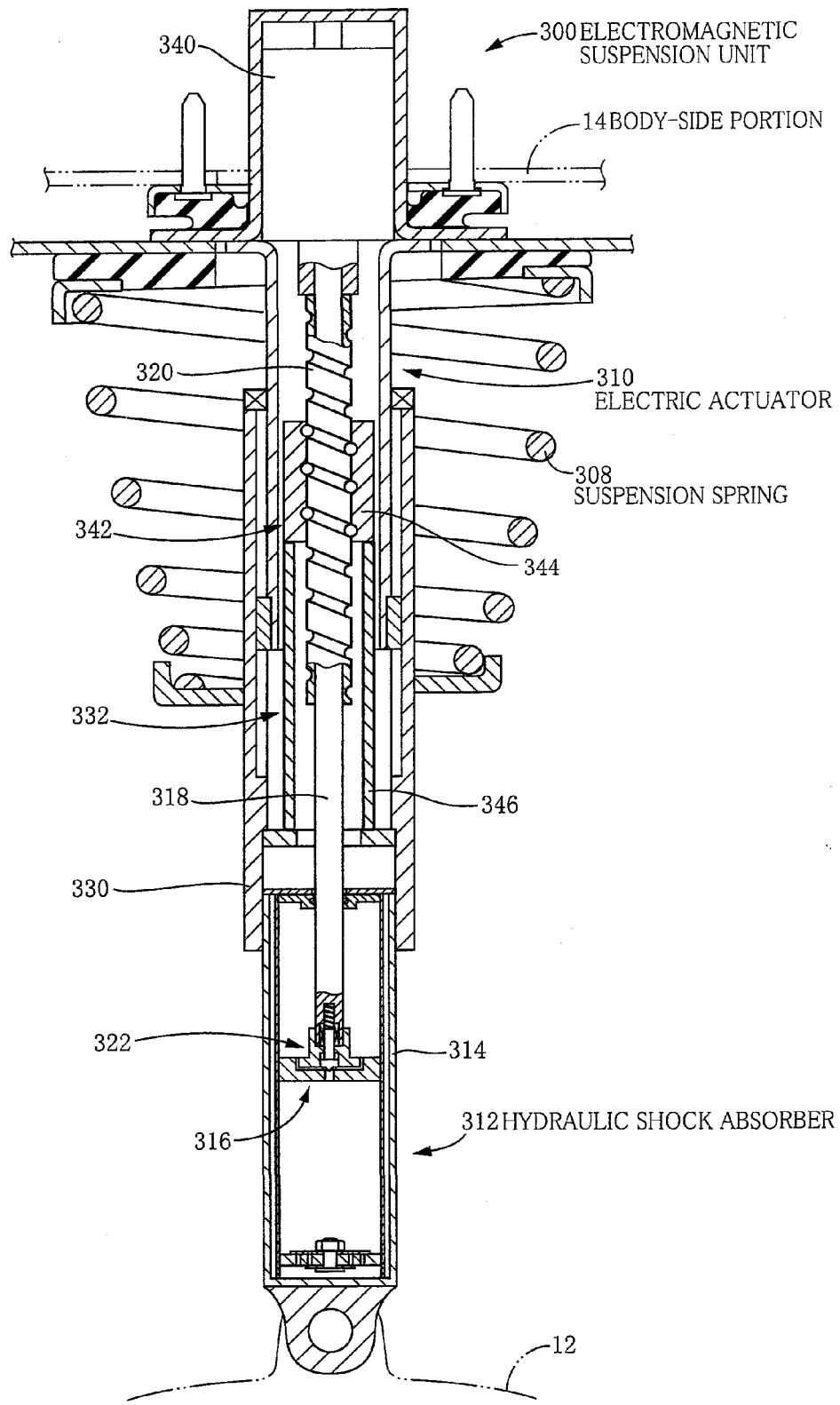
FIG. 17 A cross sectional view of an electromagnetic suspension unit included in an electromagnetic suspension system that is another embodiment of the present invention.
Figure 18:
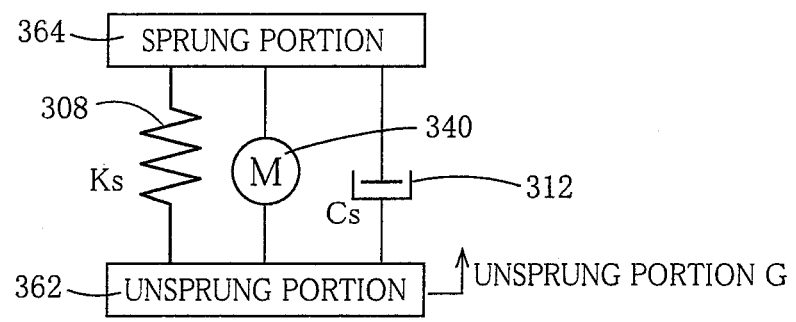
FIG. 18 A view showing an estimation model that is prepared for the above-described electromagnetic suspension unit.

In an electromagnetic suspension unit 300 shown in FIG. 17, a suspension spring 308, an electric actuator 310 and a hydraulic shock absorber 312 are disposed in parallel between the wheel-side portion 12 and the body-side portion 14.

The hydraulic shock absorber 312 includes a cylinder body 314 and a piston 316 that is slidably fitted in the cylinder body 314. The cylinder body 314 is connected to the wheel-side portion 12. A piston rod 318 of the piston 316 is provided to extend through inside a screw shaft 320, and is connected to the body-side portion 14. The piston 316 has a communication passage through which upper and lower chambers are to be brought into communication with each other. A cross sectional area of the communication passage is adjustable by an electromagnetic valve 322.

Between the cylinder body 314 and the body-side portion 14, an outer sleeve 330 and an inner sleeve 332 are provided. The inner sleeve 332 is fitted in the outer sleeve 330 such that these sleeves 330, 332 are slidable relative to each other. The outer sleeve 330 is attached to the cylinder body 314, and is unmovable relative to the cylinder body 314 in the vertical direction. The inner sleeve 332 is attached to the body-side portion 14, and is, in principle, unmovable relative to the body-side portion 14 in the vertical direction. The outer and inner sleeves 330, 332 are held in fitting engagement with each other by engagement of a pair of guide grooves and keys, and are vertically unmovable relative to each other and unrotatable relative to each other.

The suspension spring 308 is disposed between the body-side portion 14 and the outer sleeve 330 (cylinder body 314).

The electric actuator 310 includes an electric motor 340 and a force transmitting mechanism 342 which is provided to transmit a drive force of the electric motor 340 to the outer sleeve 330. The force transmitting mechanism 342 includes, in addition to the screw shaft 320 which is attached to an output shaft of the electric motor 340 and which is unrotatable relative to the output shaft of the motor 340, a nut member 344 which is held in thread engagement with the screw shaft 320, and an elongated member 346 which is fixed to the nut member 344 and the outer sleeve 330.

Upon application of a vertical force between the wheel-side portion 12 and body-side portion 14, the suspension spring 308 is caused to expand and contract whereby the shock absorber 312 is caused to expand and contract.

In the electromagnetic suspension unit 300 constructed as described above, an actual value of the distance between the wheel-side portion 12 and body-side portion 14 (distance between the sprung and unsprung portions 144, 142) is detected by the vehicle height sensor 154. The distance between the sprung and unsprung portions 144, 142 corresponds to an expansion/contraction amount of the shock absorber 312.

On the other hand, an estimated value of the distance between the sprung and unsprung portions 144, 142 is obtained in accordance with an estimation model 360 of FIG. 18. In the estimation model 360, the lower arm 12, cylinder body 314 and outer sleeve 330 cooperate with one another to constitute an unsprung portion 362, while the inner sleeve 332, body-side portion 14, piston 316 and piston rod 318 cooperate with one another to constitute a sprung portion 364. A spring coefficient of the suspension sprung 308 is represented by "Ks". A damping coefficient of the shock absorber 312 is represented by "Cs" (variable). Like in the above-described embodiment, a displacement and an absolute velocity of the sprung portion 364 are estimated based on a displacement and an absolute velocity of the unsprung portion 362 and an output Fm of the electric motor 340, whereby estimated values of the expansion/contraction amount and velocity of the shock absorber 312 can be obtained. When the actual value or the like is larger than the estimated value or the like, it is detected that the performance of the electric motor 340 is changed toward its free side and/or that the performance of the hydraulic shock absorber 312 is changed toward its expansion/contraction resistance deficient side.

Further, when the actual value or the like is smaller than the estimated value or the like, it is detected that the performance of the electric motor 340 is changed toward its lock side and/or that the performance of the hydraulic shock absorber 312 is changed toward its expansion/contraction resistance increase side.

Thus, the electromagnetic suspension unit may have a construction that is not particularly limited. The present invention is applicable to any one of electromagnetic suspension units having various kinds of constructions, thereby making it possible to detect change of the performance of any one of the various suspension units.

In the above-described embodiments, the performance change is detected while the electric motor 50, 340 is being controlled. However, it is possible to detect the performance change even while the motor 50, 340 is not being controlled. In this case, the damping force is generated by the electric motor 50, 340, so that the damping force generated by the motor 50, 340 can be obtained as an estimated value of the motor output Fm.

Further, in the above-described embodiments, the performance change is detected during running of the vehicle. However, this arrangement is not essential. That is, even during stopping of the vehicle, the performance change can be detected by vibrating the vehicle. For example, the vehicle is vibrated by forcedly activating the electric actuator with supply of an electric current to the electric motor for a predetermined time period, and then the supply of the electric current to the motor is stopped. Thus, the performance change can be detected based on state of the expansion/contraction of the shock absorber after the supply of the electric current has been stopped.

The present invention may be embodied with various other changes, modifications and improvements, such as those described in the SUMMARY OF THE INVENTION, which may be made based on knowledge of those skilled in the art.

The invention claimed is:
1. An electromagnetic suspension system comprising:
an electromagnetic suspension unit which is provided for a wheel of a vehicle and which is disposed between a body-side portion and a wheel-side portion of the vehicle, said electromagnetic suspension unit including (a) a hydraulic shock absorber and (b) an electric actuator that is configured to apply a vertical force between the body-side portion and the wheel-side portion; and
a performance-change detecting device including an actual absorber-expansion/contraction-related amount obtaining portion configured to obtain an actual value of an absorber-expansion/contraction-related amount upon application of vibration to said electromagnetic suspension unit in a vertical direction, the absorber-expansion/contraction-related amount including at least one of amount and velocity of expansion/contraction of said shock absorber in the vertical direction,
wherein said performance-change detecting device is configured to detect change of performance of said electromagnetic suspension unit, based on the actual value of the absorber-expansion/contraction-related amount obtained by said actual absorber-expansion/contraction-related amount obtaining portion, wherein said hydraulic shock absorber and said electric actuator are disposed between the body-side portion and the wheel-side portion, in series with each other via an intermediate member, wherein said actual absorber-expansion/contraction-related amount obtaining portion includes an actual expansion/contraction-related-amount calculating portion that is configured to obtain an actual value of the absorber-expansion/contraction-related amount, based on an actual value of a sprung/unsprung-portions-distance-related amount and an actual value of an electric-operation-related amount, wherein the sprung/unsprung-portions-distance-related amount includes at least one of amount and velocity of change of a distance between the body-side portion and the wheel-side portion, while the electric-operation-related amount includes at least one of amount and velocity of operation of said electric actuator, and wherein said performance-change detecting device includes:
(a) an absorber-expansion/contraction-related amount estimating portion that is configured to obtain an estimated value of the absorber-expansion/contraction-related amount;
(b) a portion that is configured to detect that a performance of said electric actuator is changed such that said electric actuator becomes closer to a free state, when a value related to an average of an absolute value of a difference between the estimated value and the actual value of the absorber-expansion/contraction-related amount over a predetermined time period is larger than a predetermined threshold value, and a value related to an average of an absolute value of a difference between the estimated value and the actual value of the sprung/unsprung-portions-distance-related amount over the predetermined time period is larger than a particular threshold value; and
(c) a portion that is configured to detect that a performance of said shock absorber is changed such that resistance acting against the expansion/contraction of said shock absorber is increased, when the value related to the average of the absolute value of the difference between the estimated value and the actual value of the absorber-expansion/contraction-related amount over the predetermined time period is larger than the predetermined threshold value, and the value related to the average of the absolute value of the difference between the estimated value and the actual value of the sprung/unsprung-portions-distance-related amount over the predetermined time period is not larger than the particular threshold value.

2. The electromagnetic suspension system according to claim 1, wherein said comparison-based performance-change detecting portion includes an expansion/contraction-resistance deficiency detecting portion that is configured, when a value related to an average of an absolute value of the actual value of the absorber-expansion/contraction-related amount over a predetermined time period is larger than an expansion/contraction-resistance deficiency threshold value that is dependent on a value related to an average of an absolute value of the estimated value of the absorber-expansion/contraction-related amount over the predetermined time period, to detect that performance of said shock absorber is changed such that resistance acting against the expansion/contraction of said shock absorber is reduced.

3. The electromagnetic suspension system according to claim 1, wherein said performance-change detecting device includes: (a) an intermediate-member-movement-related-amount estimating portion that is configured to obtain an estimated value of an intermediate-member-movement-related amount upon application of the vibration to said electromagnetic suspension unit in the vertical direction, the intermediate-member-movement-related amount including at least one of amount and velocity of movement of said intermediate member in the vertical direction; (b) an intermediate-member-movement-related-amount obtaining portion that is configured to obtain an actual value of the intermediate-member-movement-related amount, based on an actual value of the absorber-expansion/contraction-related amount and an actual value of an unsprung-portion-movement-related amount that includes at least one of amount and velocity of movement of an unsprung portion of the vehicle in the vertical direction; and (c) an intermediate-member-movement-based performance-change detecting portion that is configured, when a value related to an average of an absolute value of a difference between the actual value and estimated value of the intermediate-member-movement-related amount over a predetermined time period is larger than a predetermined intermediate-member-movement-based threshold value, to detect that the performance of said electromagnetic suspension unit is changed.

4. The electromagnetic suspension system according to claim 1,
wherein said absorber-expansion/contraction-related amount estimating portion includes (a) an intermediate-member-movement-related-amount estimating portion that is configured to obtain an estimated value of an intermediate-member-movement-related amount upon application of the vibration to said electromagnetic suspension unit in the vertical direction, the intermediate-member-movement-related amount including at least one of amount and velocity of movement of said intermediate member in the vertical direction; and (b) an intermediate-member-movement-based expansion/contraction-related-amount estimating portion that is configured to obtain an estimated value of the absorber-expansion/contraction-related amount, based on the estimated value of the intermediate-member-movement-related amount that is estimated by the intermediate-member-movement-related-amount estimating portion and an actual value of an unsprung-portion-movement-related amount that includes at least one of amount and velocity of movement of an unsprung portion of the vehicle in the vertical direction.

5. The electromagnetic suspension system according to claim 1,
wherein said performance-change detecting device includes (a) an observer that is configured to obtain an estimated value of a sprung-portion-movement-related amount and an estimated value of an intermediate-member-movement-related amount, based on actual values of amount and velocity of movement of the unsprung portion of the vehicle in the vertical direction and an actual value of a vertical force applied by said electric actuator, in accordance with a predetermined model prepared for said electromagnetic suspension unit, the sprung-portion-movement-related amount including at least one of amount and velocity of movement of a sprung portion of the vehicle in the vertical direction, the intermediate-member-movement-related amount including at least one of amount and velocity of said intermediate member in the vertical direction, (b) an electric-operation-related-amount estimated-value obtaining portion that is configured to obtain an estimated value of an electric-operation-related amount that includes at least one of amount and velocity of operation of said electric actuator, by subtracting the estimated value of the intermediate-member-movement-related amount, from the estimated value of the sprung-portion-movement-related amount, and (c) a lock-tendency-change detecting portion that is configured, when a value related to an average of an absolute value of an actual value of the electric-operation-related amount over a predetermined time period is smaller than a lock-tendency-change threshold value that is dependent on a value related to an average of an absolute value of the estimated value of the electric-operation-related amount over the predetermined time period, to detect that a performance of the electric actuator is changed such that the electric actuator becomes closer to a lock state.

6. The electromagnetic suspension system according to claim 1, wherein said performance-change detecting device includes a performance-change-level detecting portion that is configured to detect in which one of a plurality of levels the performance change of said electromagnetic suspension unit is currently found in.

7. The electromagnetic suspension system according to claim 1,
wherein said electromagnetic suspension unit is provided for each of front right, front left, rear right and rear left wheels of the vehicle, so that a plurality of electromagnetic suspension units, each of which is said electromagnetic suspension unit, and a plurality of hydraulic shock absorbers, each of which is said hydraulic shock absorber, are provided for the respective wheels,
wherein said performance-change detecting device includes a wheels-comparison-based performance-change detecting portion that is configured to detect performance changes of said shock absorbers provided for the respective front right, front left, rear right and rear left wheels, by comparing average expansion/contraction-related-amount actual values to each other, each of the average expansion/contraction-related-amount actual values being an average of an absolute value of the actual value of the absorber-expansion/contraction-related amount over a predetermined time period, and being of a corresponding one of said plurality of shock absorbers, and
wherein said wheels-comparison-based performance-change detecting portion includes at least one of (a) a portion that is configured, when one of the average expansion/contraction-related-amount actual values which is of one of said hydraulic shock absorbers provided for an assessed one of the wheels is lower than a lower limit of a predetermined range that is dependent on an average-related value of the average expansion/contraction-related-amount actual values which are of said hydraulic shock absorbers provided for the respective front right, front left, rear right and rear left wheels, to detect that the performance of said one of said shock absorbers provided for the assessed one of the wheels is changed such that resistance acting against the expansion/contraction of said one of said shock absorbers is increased, and (b) a portion that is configured, when the one of the average expansion/contraction-related-amount actual values is larger than an upper limit of the predetermined range, to detect that the performance of said one of said shock absorbers provided for the assessed one of the wheels is changed such that the expansion/contraction resistance is reduced.

8. The electromagnetic suspension system according to claim 1,
wherein said electromagnetic suspension unit is provided for each of front right, front left, rear right and rear left wheels of the vehicle, so that a plurality of electromagnetic suspension units, each of which is said electromagnetic suspension unit, and a plurality of electric actuators, each of which is said electric actuator, are provided for the respective wheels, and
wherein said performance-change detecting device includes an electric-operation-related-amount obtaining portion that is configured to obtain actual values of electric-operation-related amounts each including at least one of amount and velocity of operation of a corresponding one of said electric actuators; and an electric-actuator-performance-change detecting portion that is configured to detect change of performance of each of said electric actuators, by comparing the actual values of electric-operation-related amounts to each other.

9. The electromagnetic suspension system according to claim 1,
wherein the electric-operation-related amount is an electric expansion/contraction-related amount that includes at least one of amount and velocity of expansion/contraction of said electric actuator in the vertical direction, and
wherein said actual expansion/contraction-related-amount calculating portion of said actual absorber-expansion/contraction-related amount obtaining portion is configured to obtain the actual value of the absorber-expansion/contraction-related amount, based on the actual value of the sprung/unsprung-portions-distance-related amount and an actual value of the electric-expansion/contraction-related amount.

10. The electromagnetic suspension system according to claim 9,
wherein said actual expansion/contraction-related-amount calculating portion of said actual absorber-expansion/contraction-related amount obtaining portion is configured to obtain the actual value of the absorber-expansion/contraction-related amount, by subtracting the actual value of the electric-operation-related amount from the actual value of the sprung/unsprung-portions-distance-related amount.

11. The electromagnetic suspension system according to claim 1,
wherein said shock absorber includes a cylinder body and a piston that is slidably fitted in said cylinder body,
wherein said intermediate member is connected to one of said cylinder body and said piston, and is connected to an output member of said electric actuator,
wherein the other of said cylinder body and said piston is connected to one of the body-side portion and the wheel-side portion, such that said other of said cylinder body and said piston is vertically unmovable relative to said one of the body-side portion and the wheel-side portion,
and wherein a main body of said electric actuator is connected to the other of the body-side portion and the wheel-side portion, such that said main body of said electric actuator is vertically unmovable relative to said other of the body-side portion and the wheel-side portion.

12. The electromagnetic suspension system according to claim 1,
wherein said electric actuator includes an electric motor and a ball screw mechanism that is configured to convert a rotational motion of an output shaft of said electric motor to a linear motion of a screw rod, such that said electric actuator is caused to increase and decrease in length thereof in the vertical direction, by the linear motion of said screw rod.

13. The electromagnetic suspension system according to claim 12, wherein the electric-operation-related amount is an electric-expansion/contraction-related amount that consists of at least one of amount and velocity of expansion/contraction of said electric actuator in the vertical direction, and wherein said actual expansion/contraction-related-amount calculating portion of said actual absorber-expansion/contraction-related amount obtaining portion is configured to obtain the actual value of the absorber-expansion/contraction-related amount, based on the actual value of the sprung/unsprung-portions-distance-related amount and an actual value of the electric-expansion/contraction-related amount.

14. The electromagnetic suspension system according to claim 1, wherein the free state includes a state in which the electric actuator is unpowered.

\* \* \* \* \*